United States Patent
Mulder et al.

(10) Patent No.: US 10,987,668 B2
(45) Date of Patent: Apr. 27, 2021

(54) TEST CARD WITH WELL SHELF

(71) Applicant: bioMerieux, Inc., Durham, NC (US)

(72) Inventors: Ross Mulder, Lake Saint Louis, MO (US); Noah Monroe, Wood River, IL (US); Raymond O'Bear, Granite City, IL (US); Brian Livingston, St. Louis, MO (US); Patrick Alan Yerbic, St. Louis, MO (US)

(73) Assignee: bioMerieux, Inc., Durham, NC (US)

( * ) Notice: Subject to any disclaimer, the term of this patent is extended or adjusted under 35 U.S.C. 154(b) by 399 days.

(21) Appl. No.: 15/852,562

(22) Filed: Dec. 22, 2017

(65) Prior Publication Data

US 2018/0178214 A1    Jun. 28, 2018

Related U.S. Application Data

(60) Provisional application No. 62/438,531, filed on Dec. 23, 2016.

(51) Int. Cl.
*B01L 3/00* (2006.01)

(52) U.S. Cl.
CPC ....... *B01L 3/502707* (2013.01); *B01L 3/5027* (2013.01); *B01L 3/502723* (2013.01); *B01L 2200/0684* (2013.01); *B01L 2300/021* (2013.01); *B01L 2300/0816* (2013.01); *B01L 2300/0851* (2013.01); *B01L 2300/0858* (2013.01); *B01L 2300/0861* (2013.01); *B01L 2300/0867* (2013.01); *B01L 2300/0874* (2013.01); *B01L 2300/0887* (2013.01); *B01L 2400/049* (2013.01); *B01L 2400/0457* (2013.01)

(58) Field of Classification Search
None
See application file for complete search history.

(56) References Cited

U.S. PATENT DOCUMENTS

| | | | |
|---|---|---|---|
| 5,180,555 | A | 1/1993 | Monget |
| 5,609,228 | A | 3/1997 | LeDeit et al. |
| D382,647 | S | 8/1997 | Staples et al. |
| 5,746,980 | A | 5/1998 | O'Bear et al. |
| 5,762,873 | A | 6/1998 | Fanning et al. |
| 5,869,005 | A | 2/1999 | O'Bear et al. |

(Continued)

FOREIGN PATENT DOCUMENTS

| | | | |
|---|---|---|---|
| JP | 2010-032487 A | 2/2010 | |
| WO | WO-2016166315 A1 * | 10/2016 | ............ C12M 23/38 |

OTHER PUBLICATIONS

International Search Report and Written Opinion for Application No. PCT/US2017/068230 dated Mar. 12, 2018, 9 pages.

(Continued)

*Primary Examiner* — Paul S Hyun
(74) *Attorney, Agent, or Firm* — Alston & Bird LLP

(57) ABSTRACT

Provided herein are a test card, method of manufacturing the same, and mold for manufacturing the same. The test card may include a body and a well. The body may include a first surface and a second surface opposite the first surface. The well may define an opening extending from the first surface to the second surface and configured to receive a sample therein. The well may further include a shelf extending into the opening, such that the opening is narrower between the shelf and the second surface than between the shelf and the first surface.

21 Claims, 36 Drawing Sheets

(56) References Cited

U.S. PATENT DOCUMENTS

| | | |
|---|---|---|
| 5,888,455 A | 3/1999 | Seaton et al. |
| 5,916,812 A | 6/1999 | Chen et al. |
| 5,932,177 A | 8/1999 | O'Bear et al. |
| D414,272 S | 9/1999 | O'Bear et al. |
| 5,951,952 A | 9/1999 | O'Bear et al. |
| 5,965,090 A | 10/1999 | Fanning et al. |
| 6,024,921 A | 2/2000 | Freiner et al. |
| 6,086,824 A | 7/2000 | Fanning et al. |
| 6,136,270 A | 10/2000 | Maes et al. |
| 6,156,565 A | 12/2000 | Maes et al. |
| 6,267,929 B1 | 7/2001 | Staples et al. |
| 7,601,300 B2 | 10/2009 | Blanton et al. |
| D621,060 S | 8/2010 | Handique |
| D689,780 S | 9/2013 | O'Bear et al. |
| D689,781 S | 9/2013 | O'Bear et al. |
| D689,782 S | 9/2013 | O'Bear et al. |
| D690,216 S | 9/2013 | O'Bear et al. |
| D714,172 S | 9/2014 | O'Bear et al. |
| D732,187 S | 6/2015 | Houkal et al. |
| D764,067 S | 8/2016 | Tipton et al. |
| D775,344 S | 12/2016 | Wu |
| 9,841,377 B2 | 12/2017 | O'Bear et al. |
| D835,797 S | 12/2018 | Santos et al. |
| D835,805 S | 12/2018 | Evans et al. |
| 2003/0026738 A1* | 2/2003 | Everett ............ B01L 3/5025 422/536 |
| 2007/0202538 A1 | 8/2007 | Glezer et al. |
| 2012/0088263 A1 | 4/2012 | Bruno et al. |
| 2012/0141325 A1 | 6/2012 | O'Bear et al. |
| 2013/0225445 A1 | 8/2013 | Seo et al. |
| 2013/0273592 A1 | 10/2013 | Colin et al. |
| 2014/0113366 A1 | 4/2014 | Dahan et al. |
| 2015/0367341 A1 | 12/2015 | Zhou et al. |
| 2016/0236193 A1 | 8/2016 | Colin et al. |
| 2018/0178214 A1 | 6/2018 | Mulder et al. |

OTHER PUBLICATIONS

*Construction Injection Molds Classification—Injection Mold Design Tutorial, Technology and Engineering*, [online][retrieved Apr. 12, 2018]. Retrieved from the Internet: <URL: http://mould-technology.blogspot.com/2007/12/injection-molds-classification.html>. (Dec. 2007) 11 pages.

Office Action for Australian Application No. 2017382375 dated Sep. 13, 2019.

Partial European Search Report for Application No. 17882854.7 dated Jun. 9, 2020.

\* cited by examiner

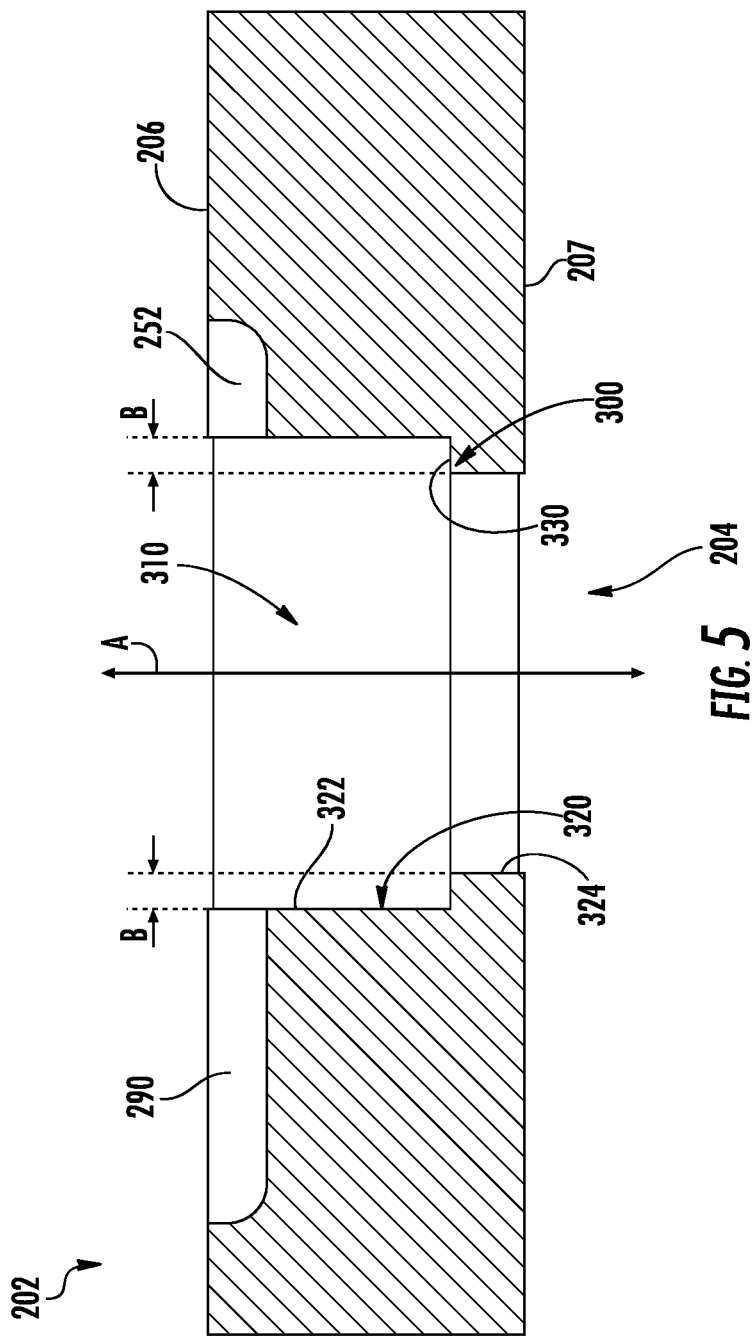

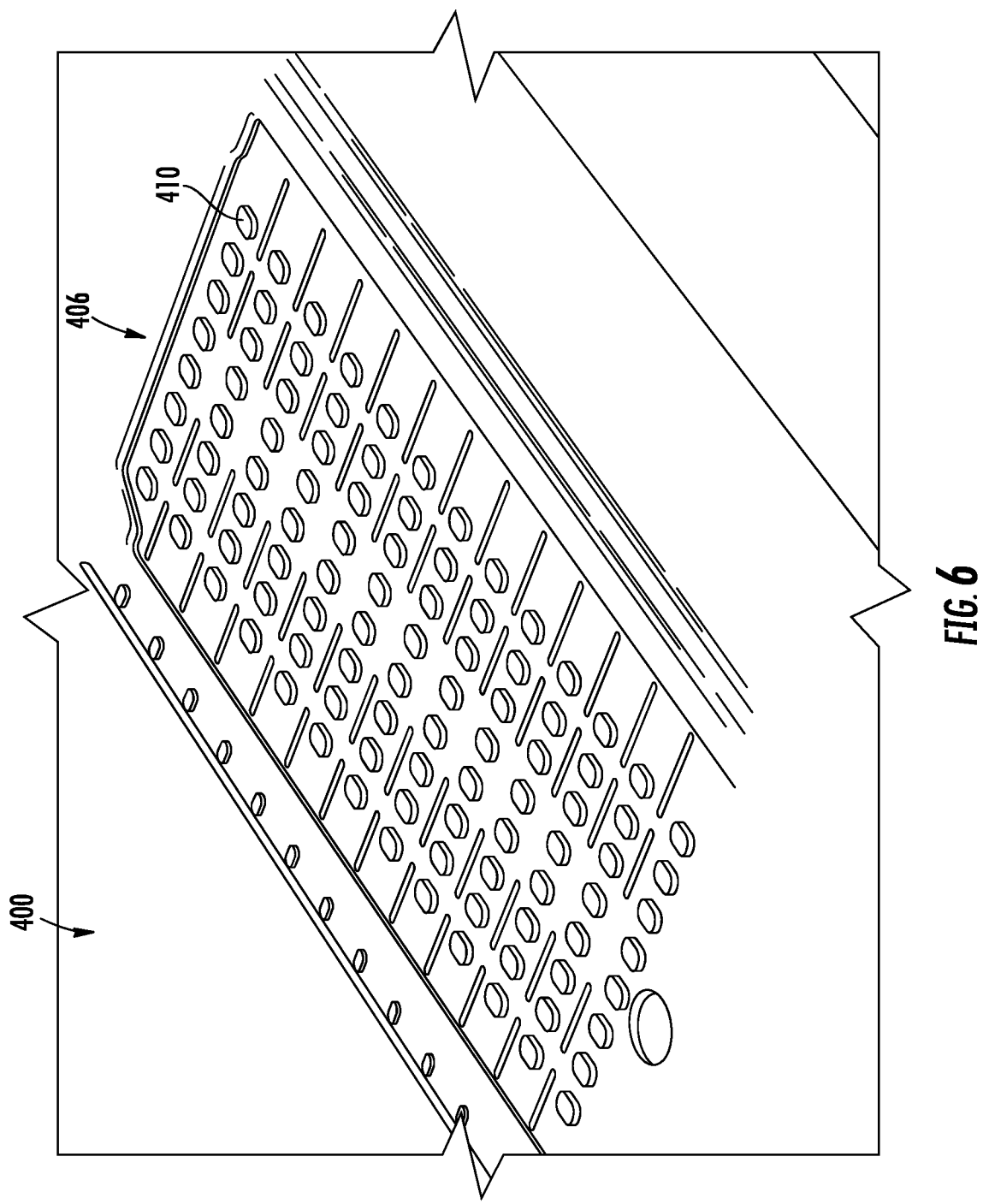

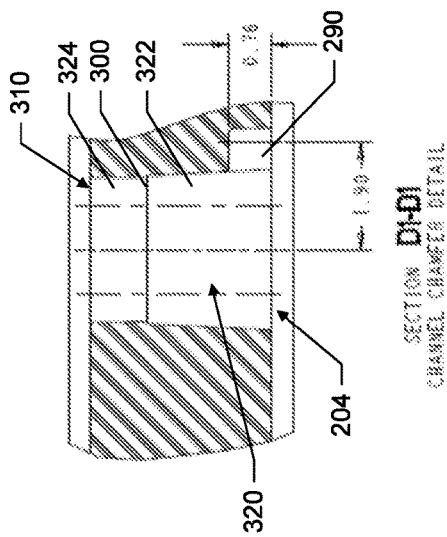
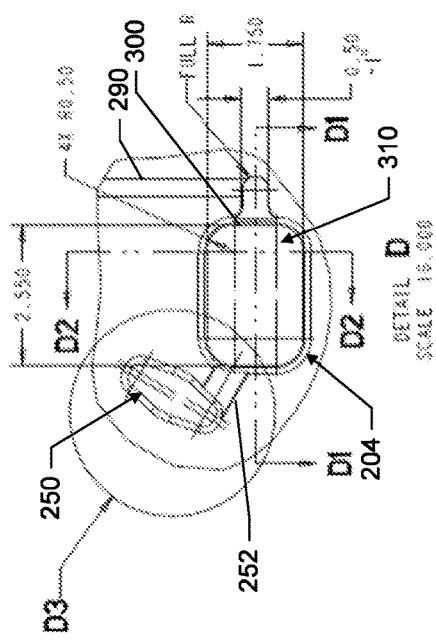
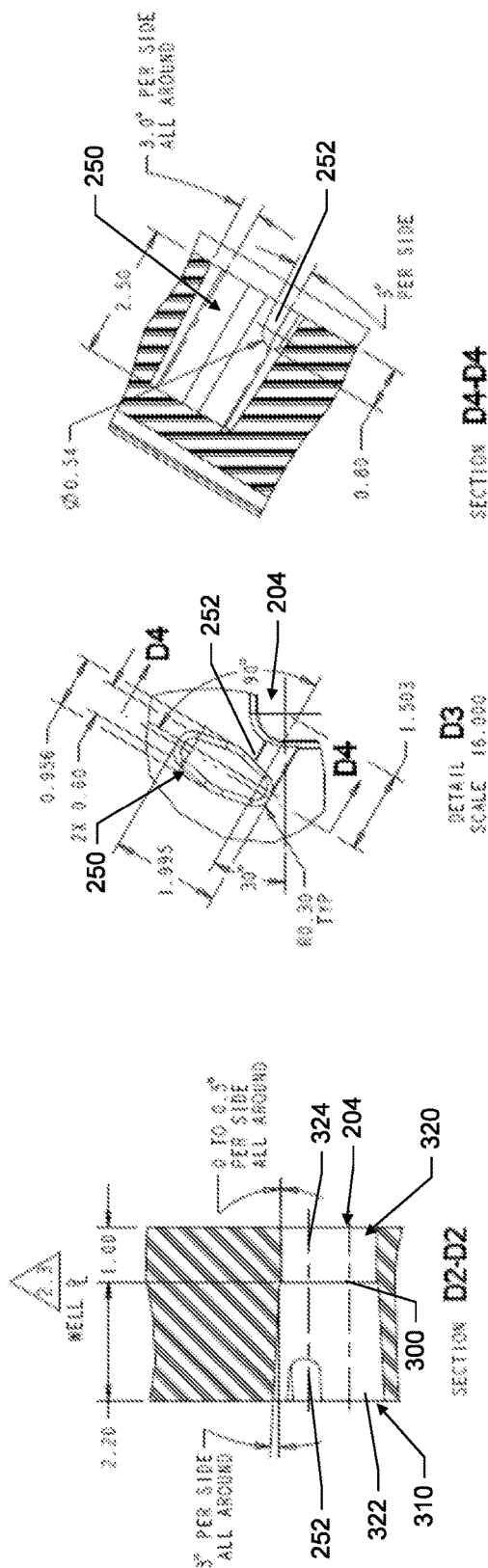
FIG. 7A
FIG. 7B
FIG. 7C
FIG. 7D
FIG. 7E

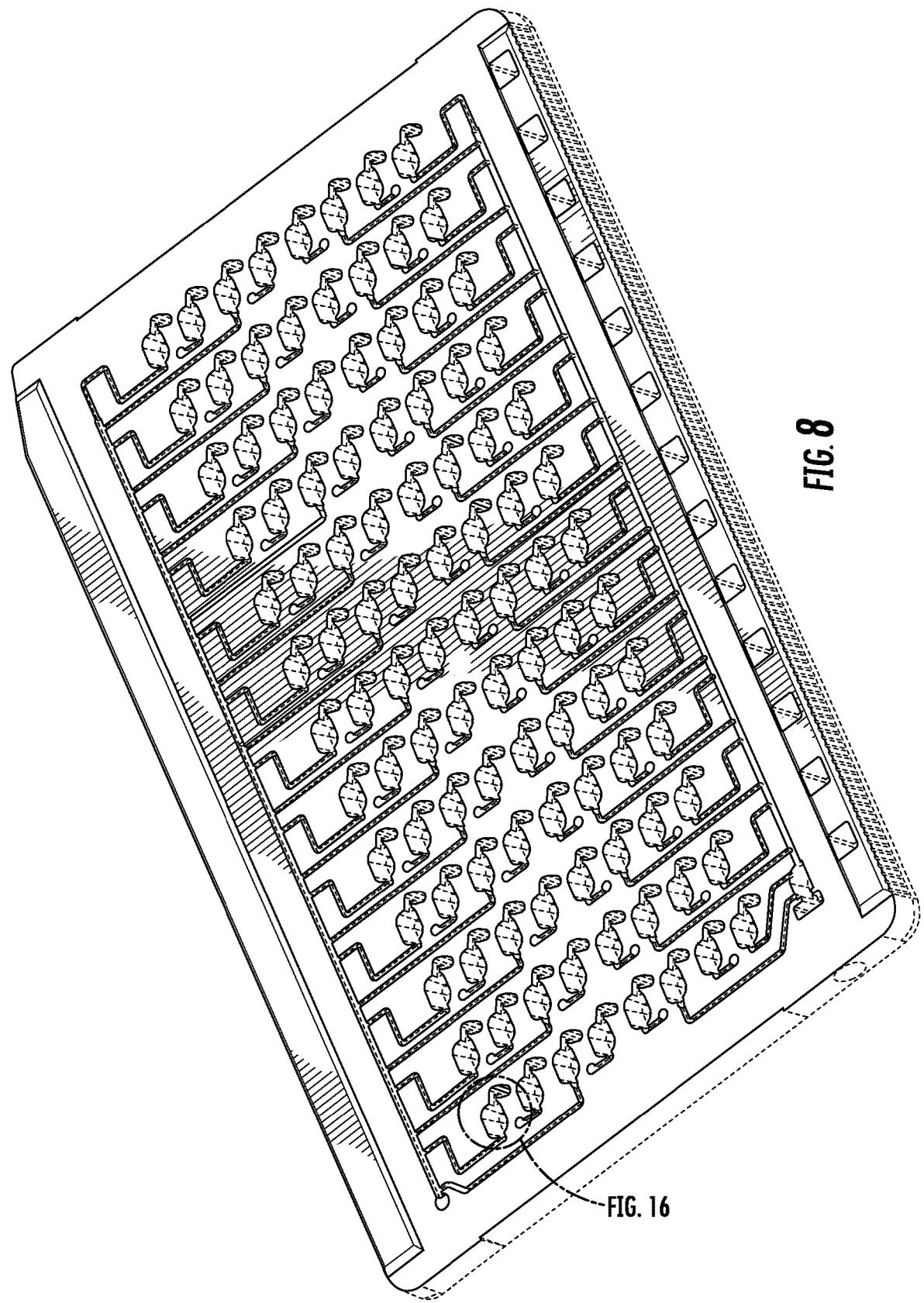

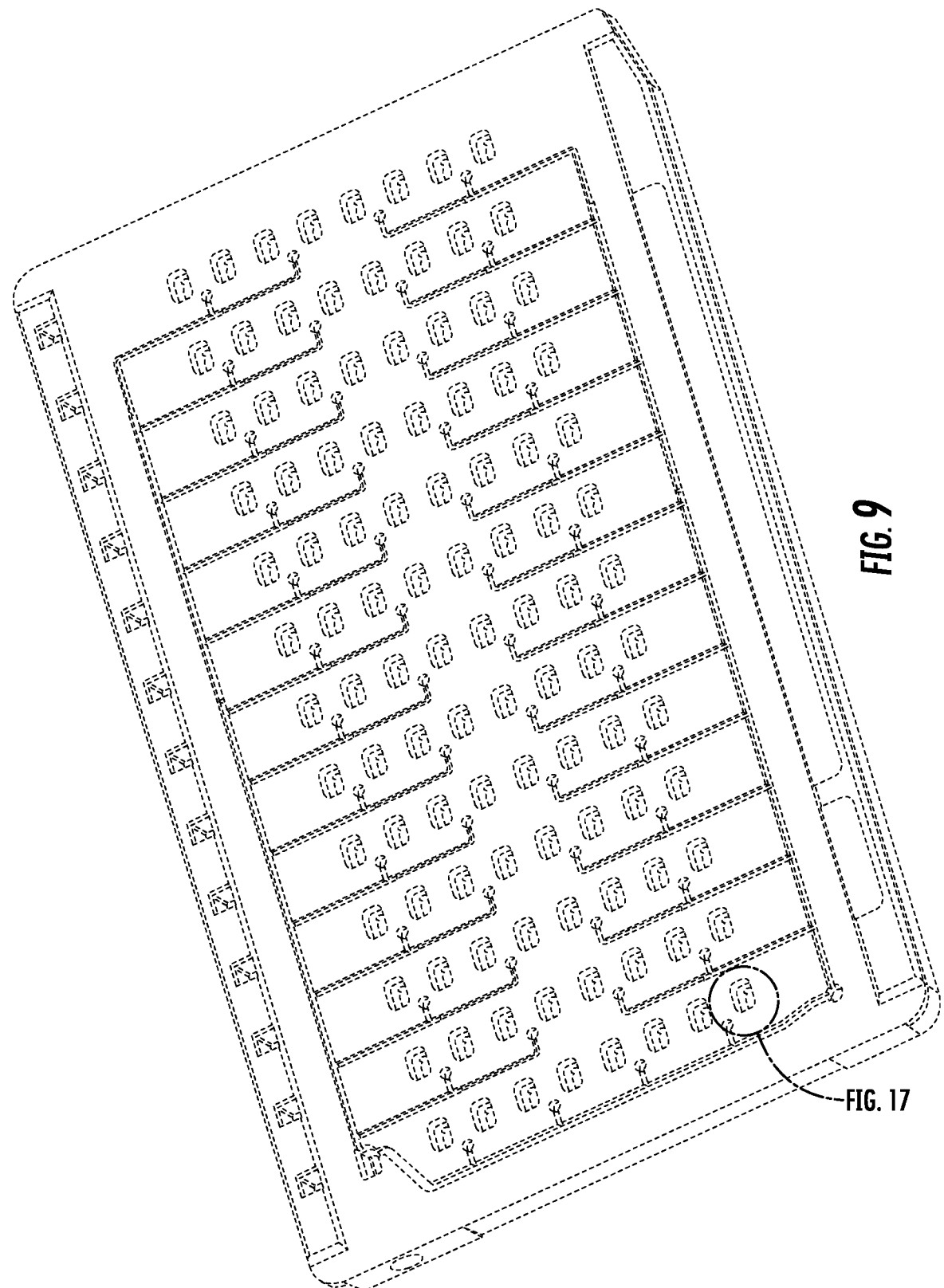

TEST CARD WITH WELL SHELF

CROSS-REFERENCE TO RELATED APPLICATION

This application claims the benefit under 35 U.S.C. § 119 of U.S. provisional application No. 62/438,531, which is entitled "Test Card With Well Shelf" and was filed on Dec. 23, 2016, the contents of which are incorporated by reference herein in their entirety.

BACKGROUND

Sample test cards are used to quickly and accurately study biological samples. Typically, test cards are used in conjunction with spectroscopic or other automated analysis machines. An example of a test card system is the Vitek® microbial identification and antimicrobial susceptibility testing cards and corresponding Vitek® machines.

The test card contains the reagents and receives the patient samples in a series of small wells, formed in the card in rows and columns and sealed, typically with tape or other sealing membranes on both sides. The test cards are filled with patient sample material through fine hydraulic channels formed in the card.

The inventor has discovered several areas for improvement in existing test cards and their corresponding manufacturing techniques. Specifically, at least 5 to 20% of wells were discovered by the inventor to include air bubbles during filling, which bubbles increase the error rate of the testing machine and cause the test card systems to produce inaccurate results. These bubbles were discovered to have been caused by, inter alia, the hydrophobic nature of the chemical components along with the size and internal configuration of the well, with the bubbles being formed by a combination of physical and chemical attributes. In some instances, the inventor discovered that existing molding techniques may cause bubble formation. For example, particular orientations of parting lines from the mold sections may result in a well that traps air under the overhang created by the parting lines.

Applicant has identified a number of additional areas for improvement associated with conventional test cards and other associated systems. Through applied effort, ingenuity, and innovation, many of these identified problems have been solved by developing solutions that are included in embodiments of the present invention, many examples of which are described in detail herein.

BRIEF SUMMARY

Test cards, their associated methods of use and manufacture, and corresponding molds for the manufacture of the test cards are provided herein.

In one embodiment, a test card is provided that may include a body comprising a first surface and a second surface opposite the first surface. The test card may include a well defining an opening extending from the first surface to the second surface and configured to receive a sample therein. The well may include a shelf extending into the opening, such that the opening is narrower between the shelf and the second surface than between the shelf and the first surface.

In some embodiments, a first distance between the shelf and the first surface may be greater than the distance between the shelf and the second surface. The shelf may extend from 0.035 mm to 0.05 mm into the opening.

In some embodiments, the well may define a wall bounding the opening and extending between the first surface and the second surface of the card. A first portion of the wall may extend from the shelf to the first surface and a second portion of the wall may extend from the shelf to the second surface. The shelf may protrude from the wall at a junction of the first portion and the second portion. In some embodiments, the shelf may define a shelf surface substantially parallel to the first surface or the second surface, and the shelf surface may be disposed at a junction of the first portion of the wall and the second portion of the wall. For example, the shelf surface may define a radial width from 0.035 mm to 0.05 mm relative to a longitudinal axis of the well.

In some embodiments, the cross-sectional area of the opening within a plane parallel to the first or second surface may be greater between the shelf and the first surface than between the shelf and the second surface. In some embodiments, the cross-sectional area of the opening within a plane parallel to the first or second surface may be greater at all axial positions between the shelf and the first surface than between the shelf and the second surface In some embodiments, the shelf may extend circumferentially about the opening within the well.

In another example embodiment, a method of manufacturing a test card may be provided. The test card may include a body comprising a first surface and a second surface opposite the first surface, a well defining an opening extending from the first surface to the second surface and configured to receive a sample therein. The well may include a shelf extending into the opening, such that the opening is narrower between the shelf and the second surface than between the shelf and the first surface. The method may include aligning a first mold plate with a second mold plate. The first mold plate may include a first pin having a first shape corresponding to a portion of the well extending from the shelf to the first surface. The second mold plate may include a second pin having a second shape corresponding to a portion of the well extending from the shelf to the second surface. The first pin may be narrower than the second pin. The method may further include molding a test plate between the first mold plate and the second mold plate.

In some embodiments of the method, the shelf may be created at the intersection of the first mold plate and the second mold plate.

In yet another example embodiment, a mold configured to form a test card is provided. The test card may include a body comprising a first surface and a second surface opposite the first surface, and a well defining an opening extending from the first surface to the second surface and configured to receive a sample therein. The well may include a shelf extending into the opening, such that the opening is narrower between the shelf and the second surface than between the shelf and the first surface. The mold may include a first mold plate defining a first pin having a first shape corresponding to a portion of the well extending from the shelf to the first surface, and a second mold plate defining a second pin having a second shape corresponding to a portion of the well extending from the shelf to the second surface. The first pin may be narrower than the second pin.

In some embodiments of the mold, the first pin may be taller than the second pin.

In some further embodiments, a distal end of the first pin may be from 0.07 mm to 0.1 mm narrower than a distal end of the second pin.

BRIEF DESCRIPTION OF THE SEVERAL VIEWS OF THE DRAWINGS

Figure 1:
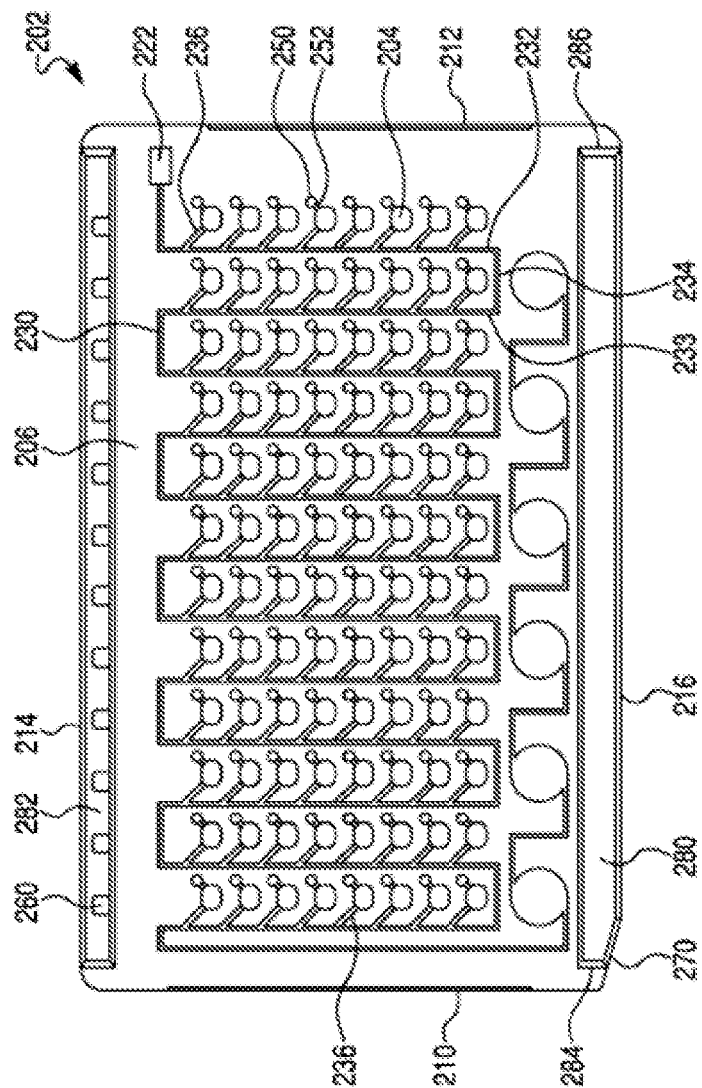
Figure 2:
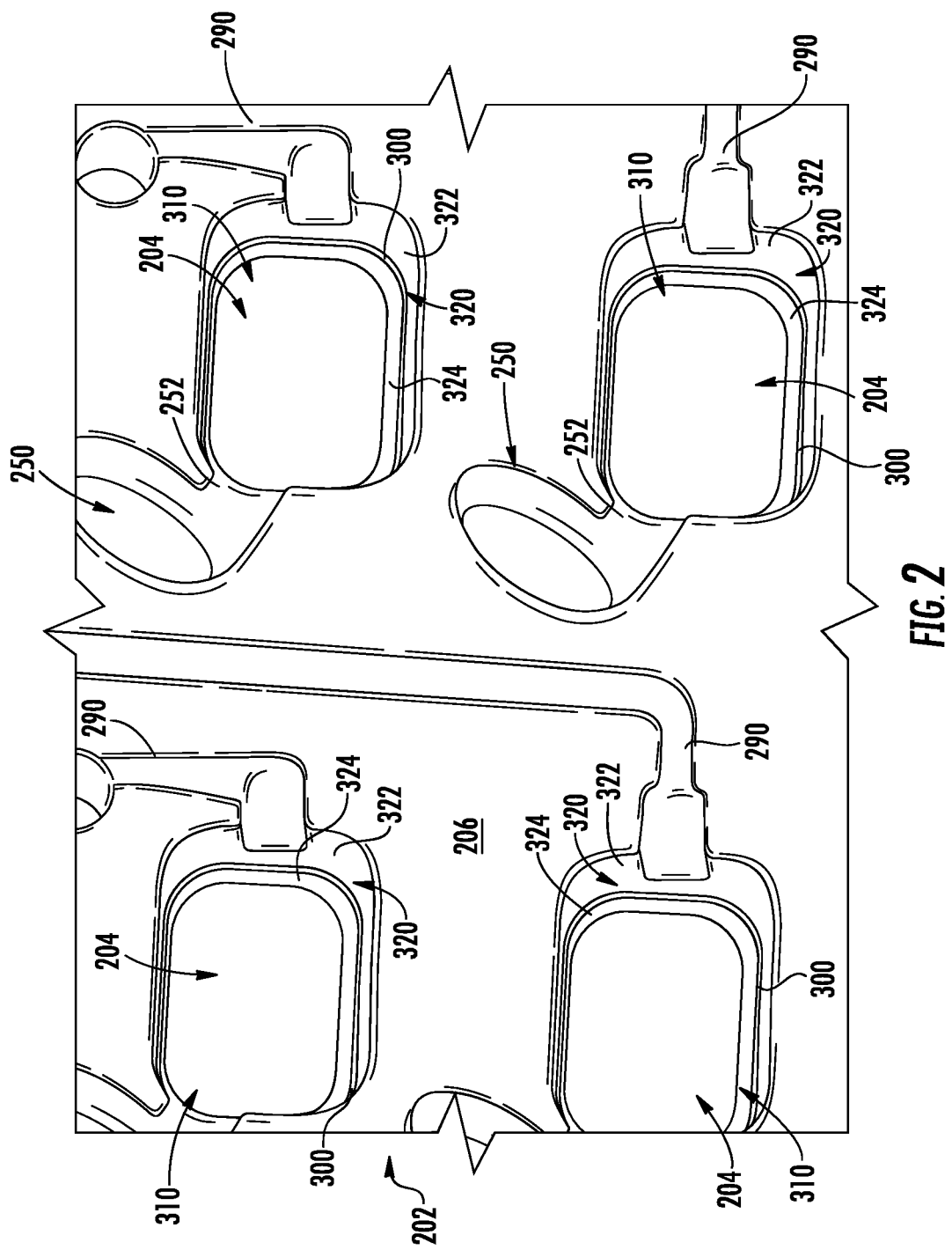
Figure 3:
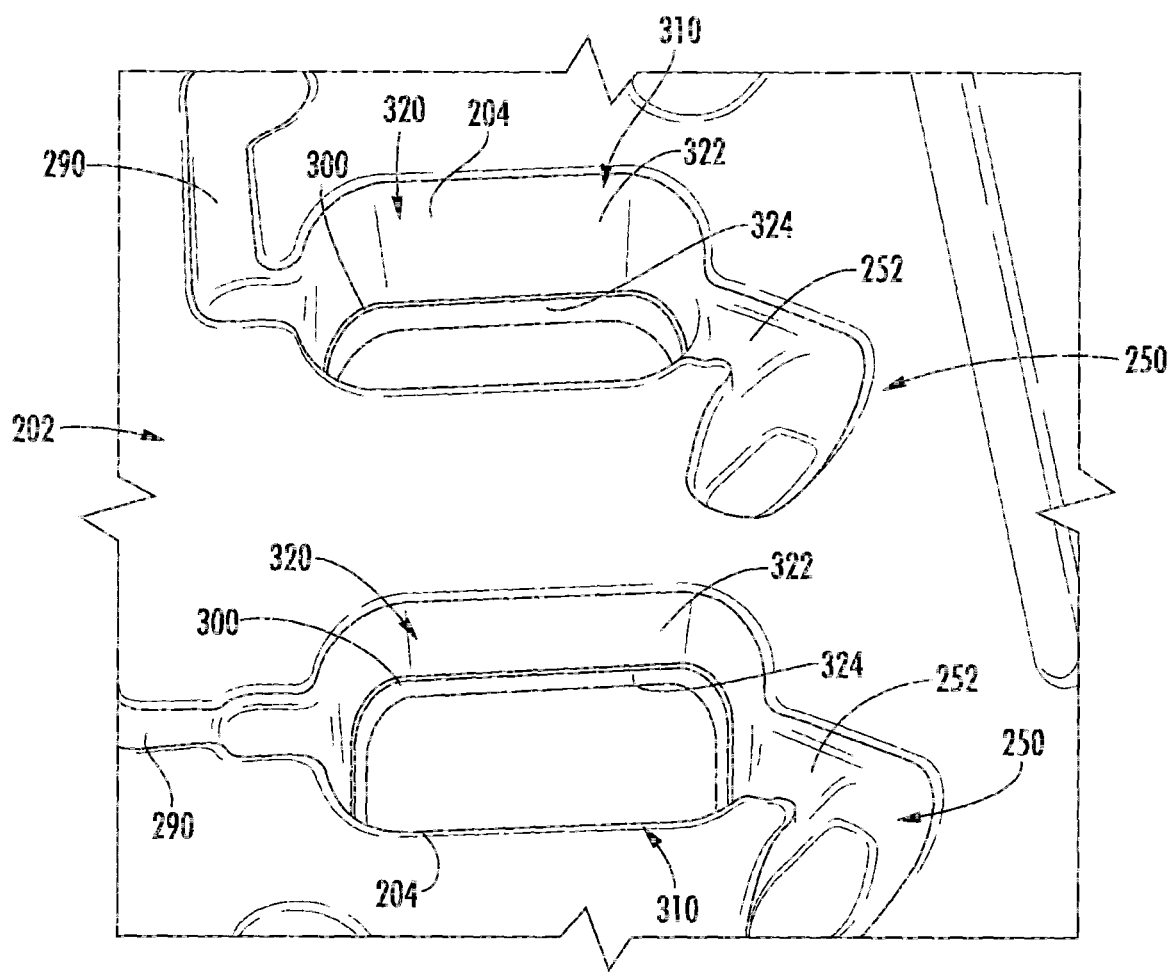
Figure 4:
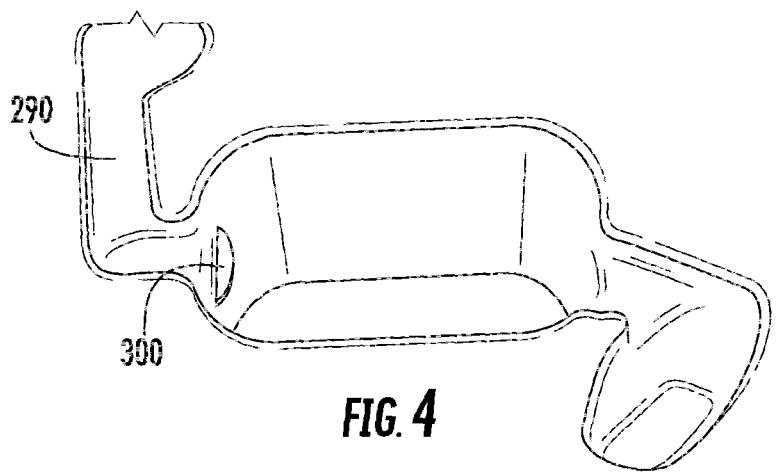
Figure 10:
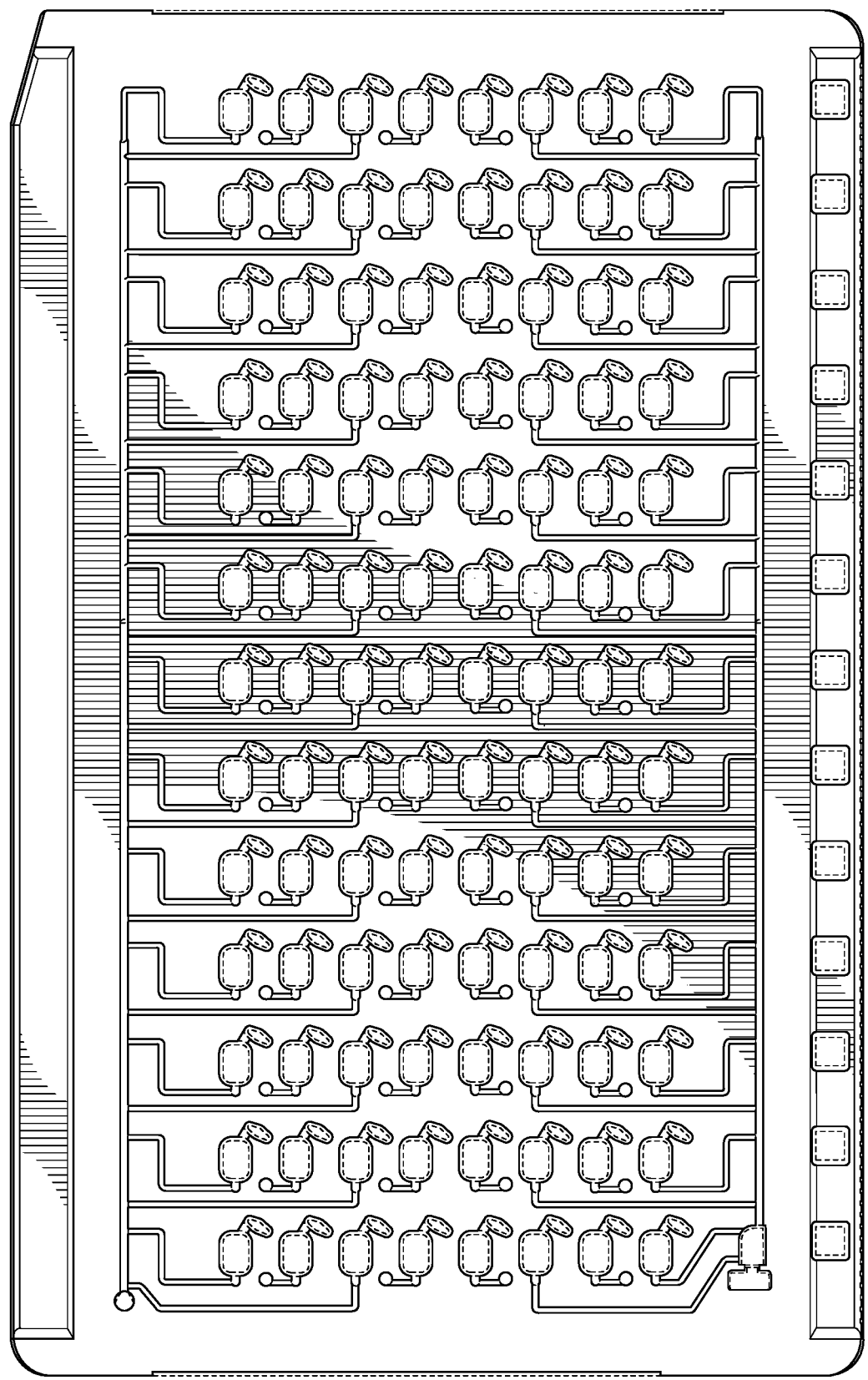
Figure 11:
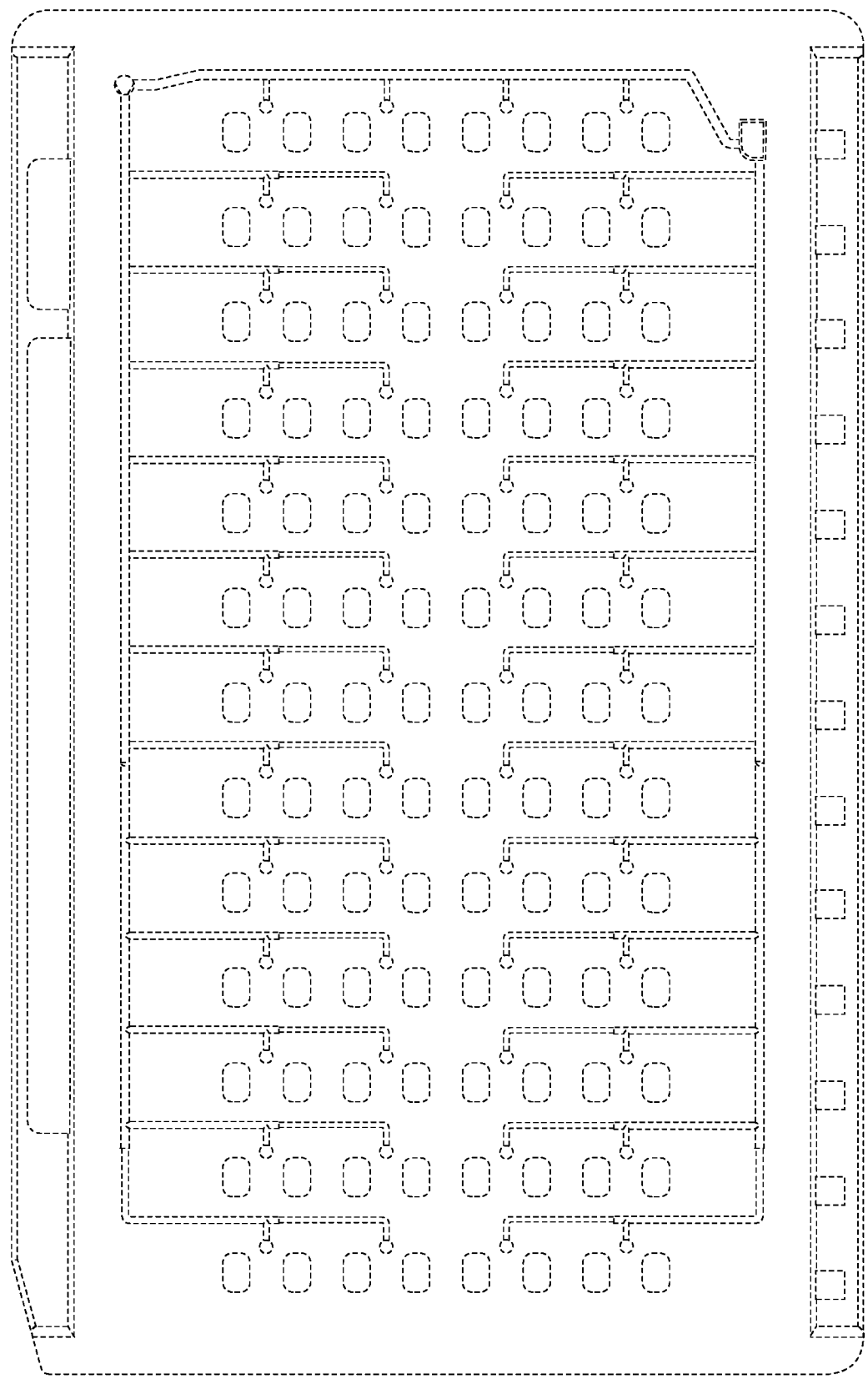
Figure 12:
Figure 13:
Figure 14:
Figure 15:
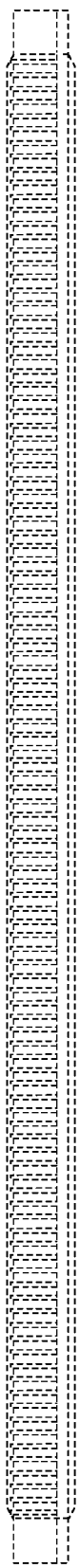
Figure 16:
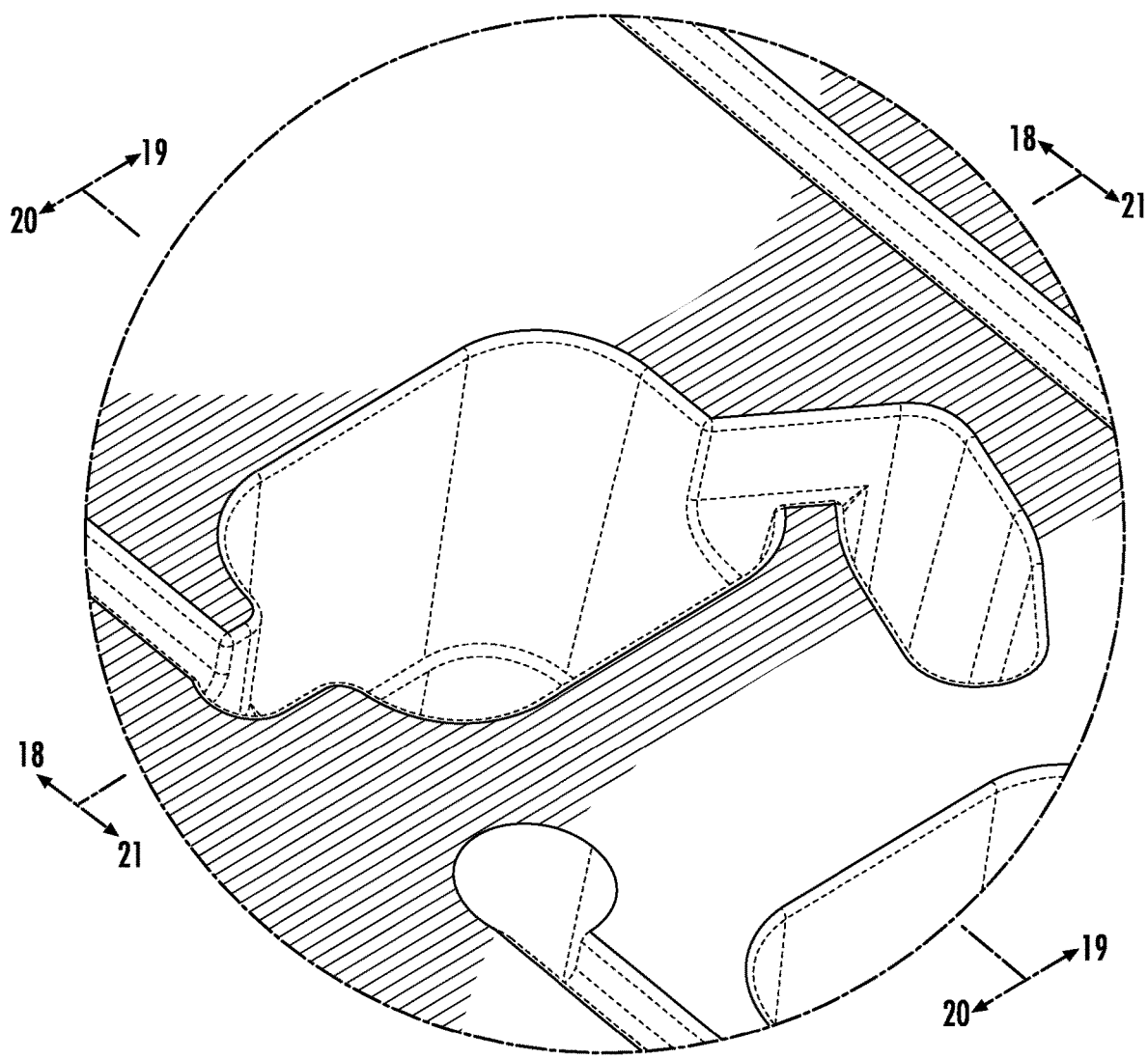
Figure 17:
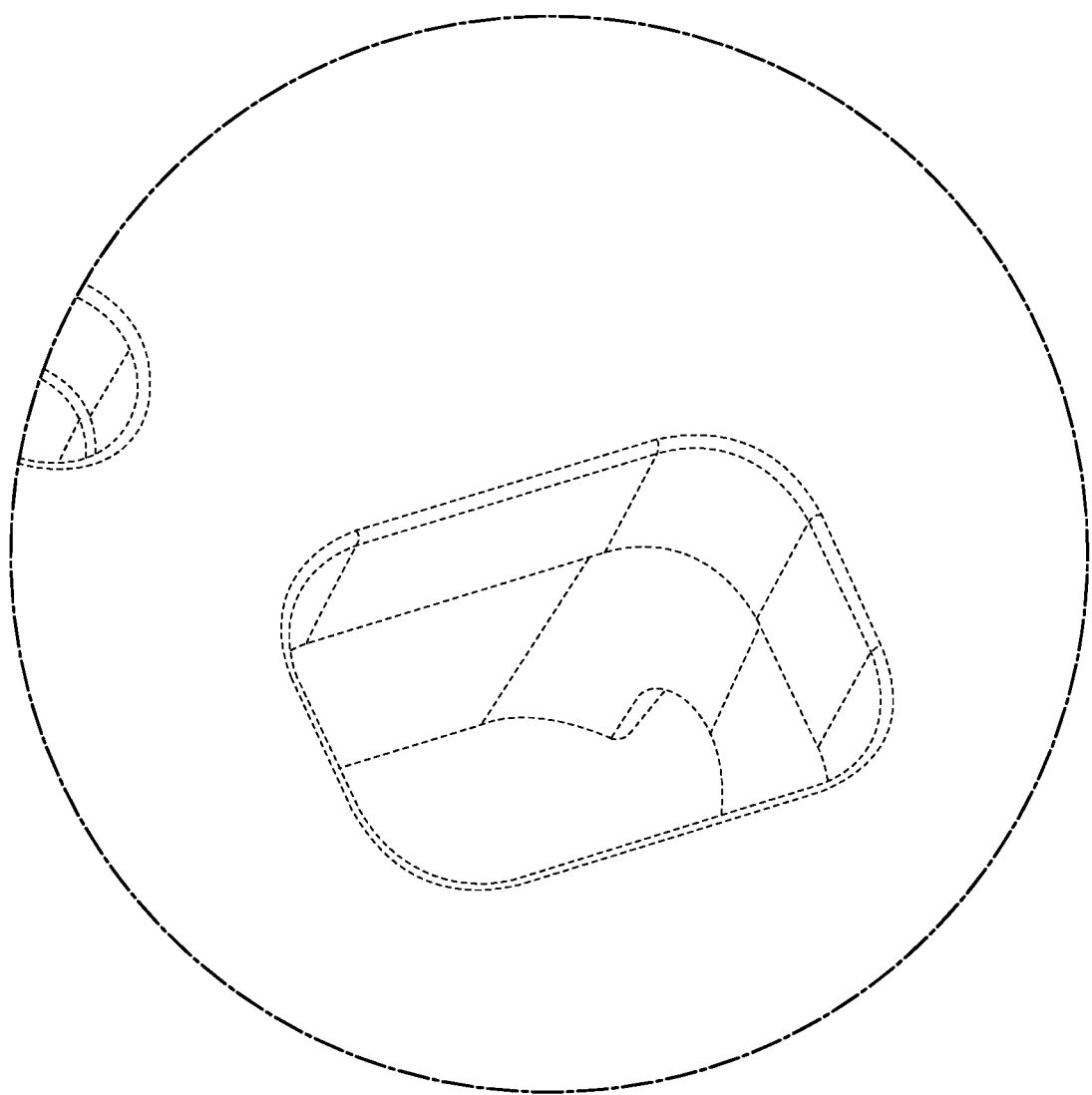
Figure 18:
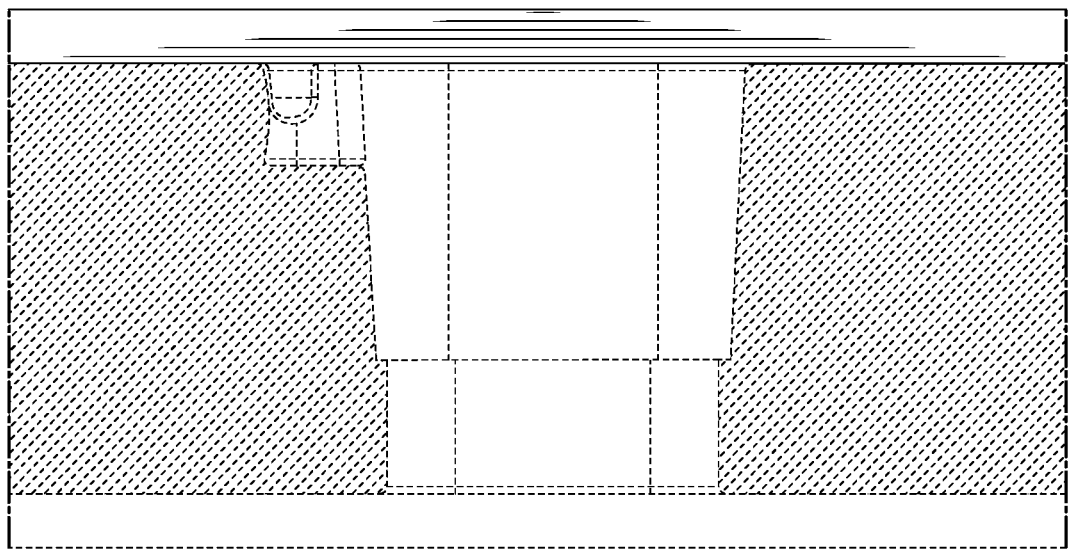
Figure 19:
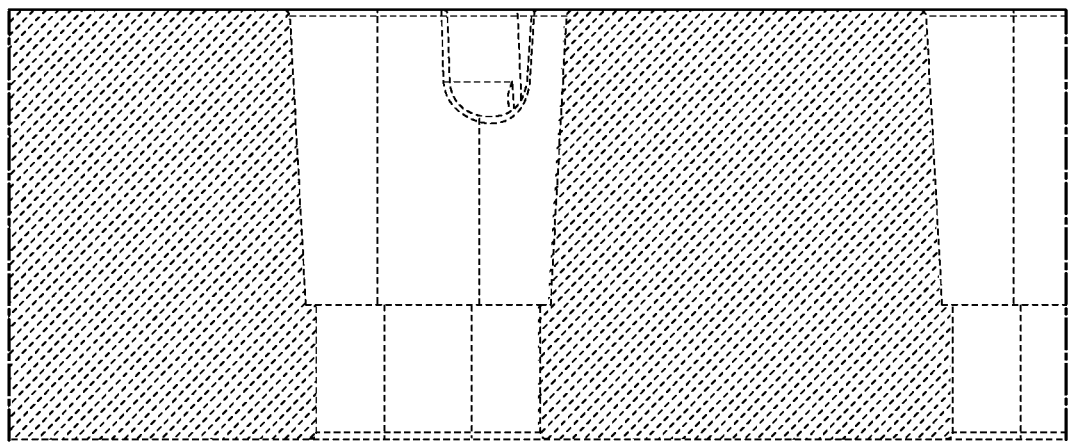
Figure 20:
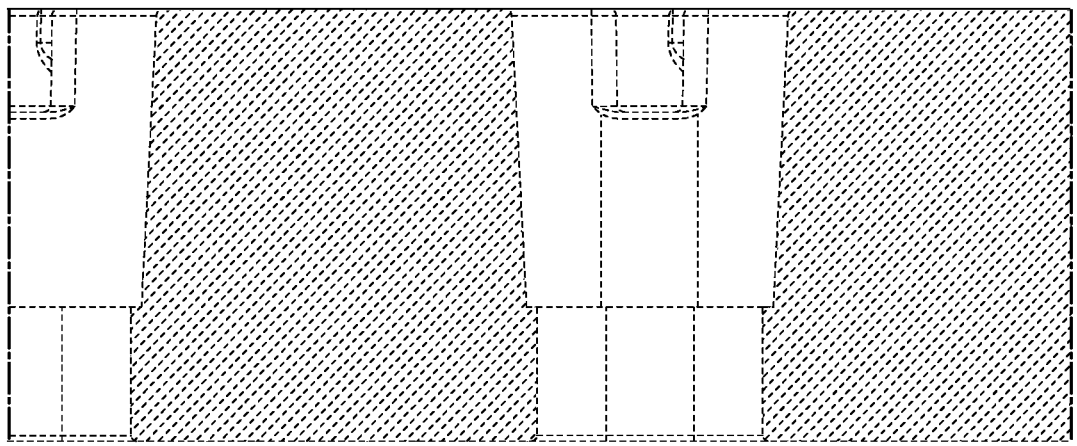
Figure 21:
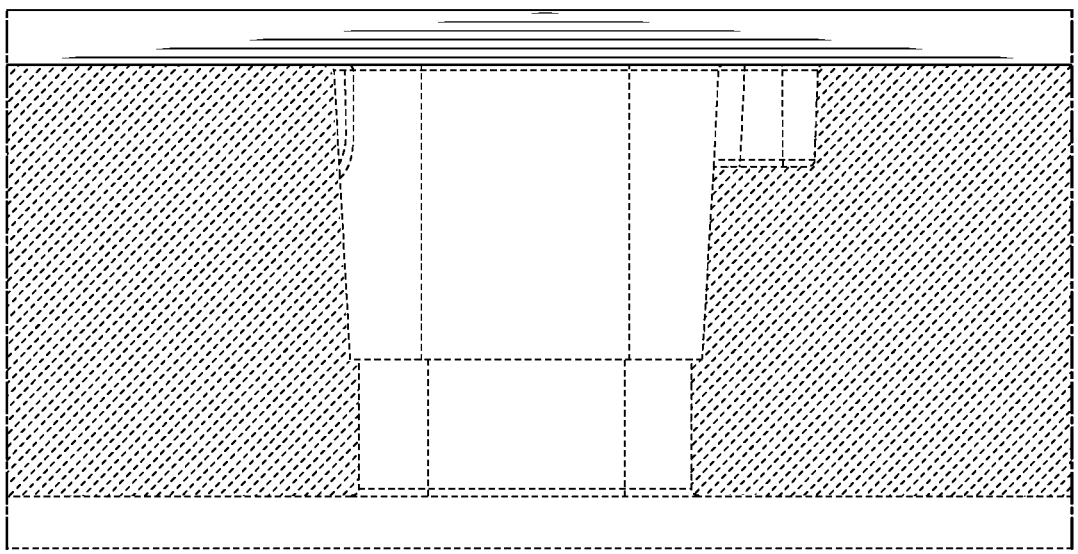
Figures 22, 30:
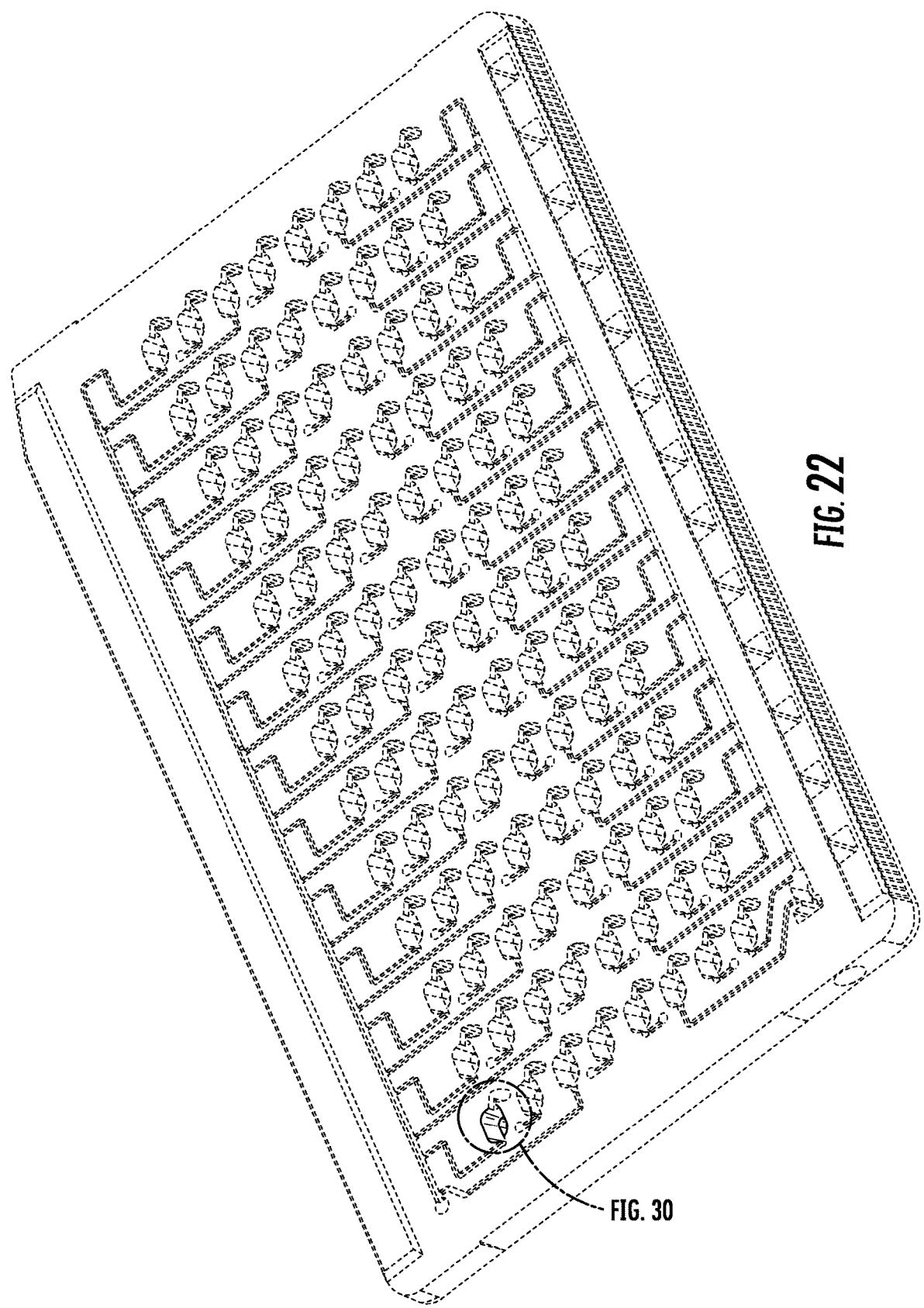
Figures 23, 31:
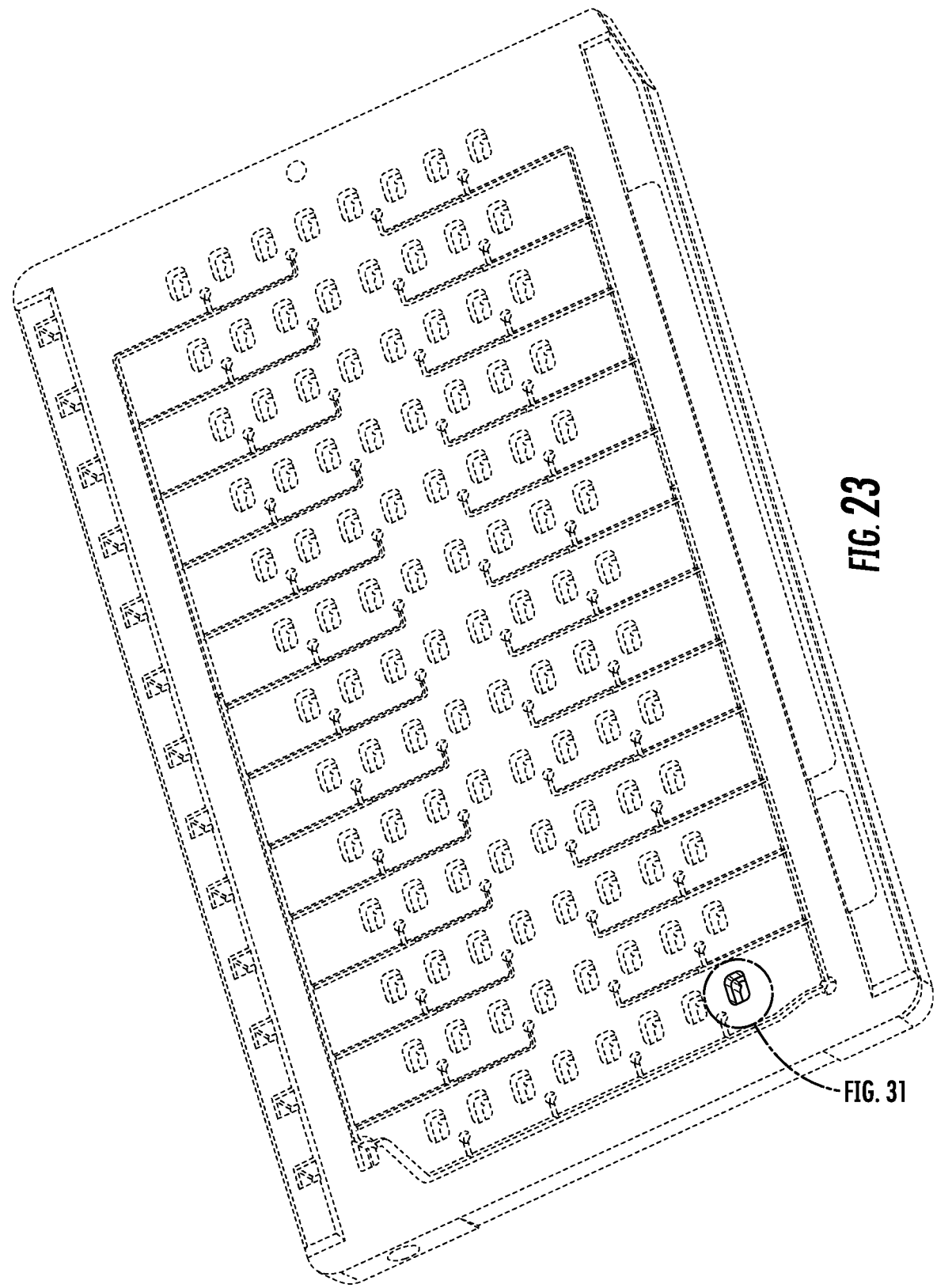
Figure 24:
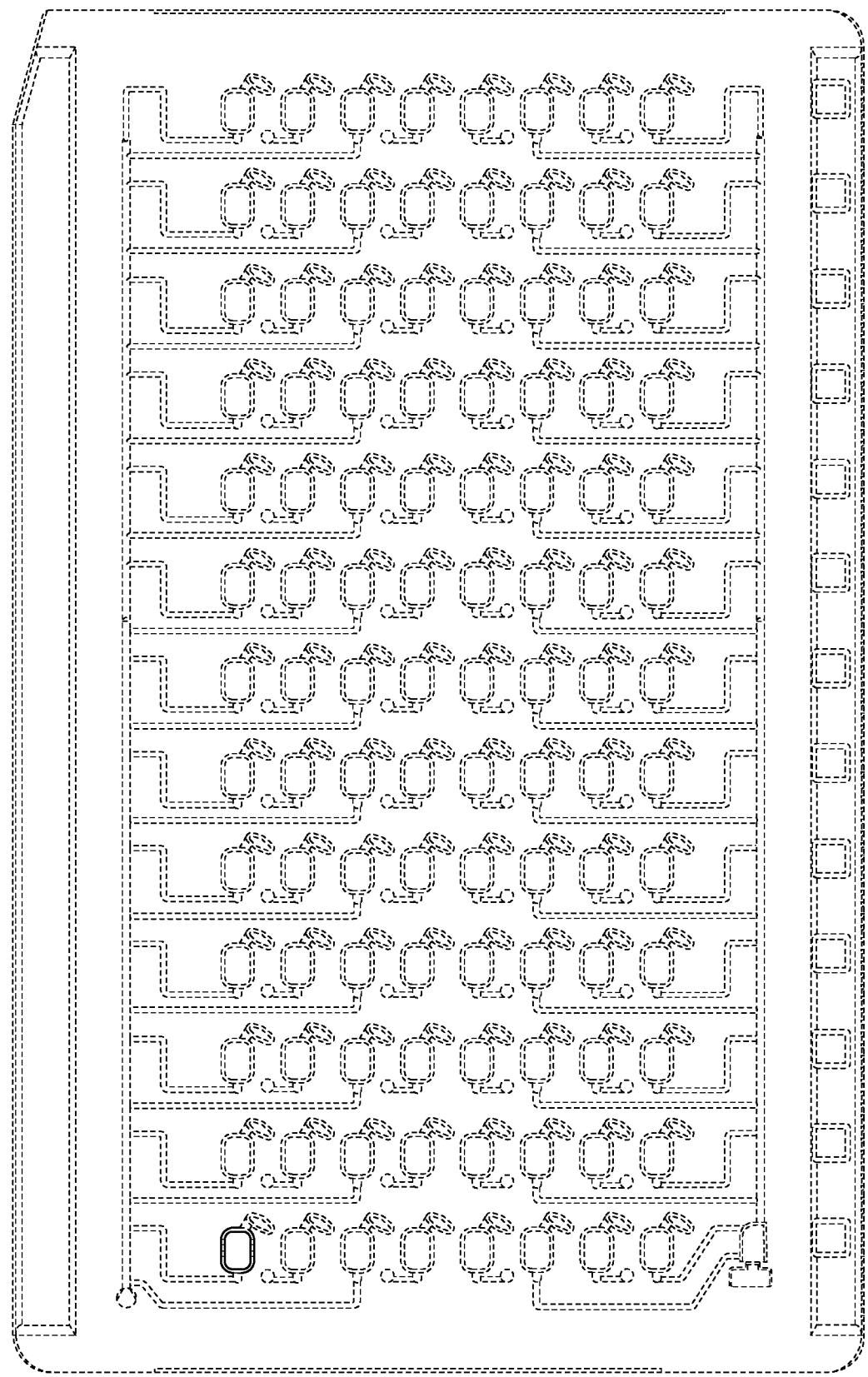
Figure 25:
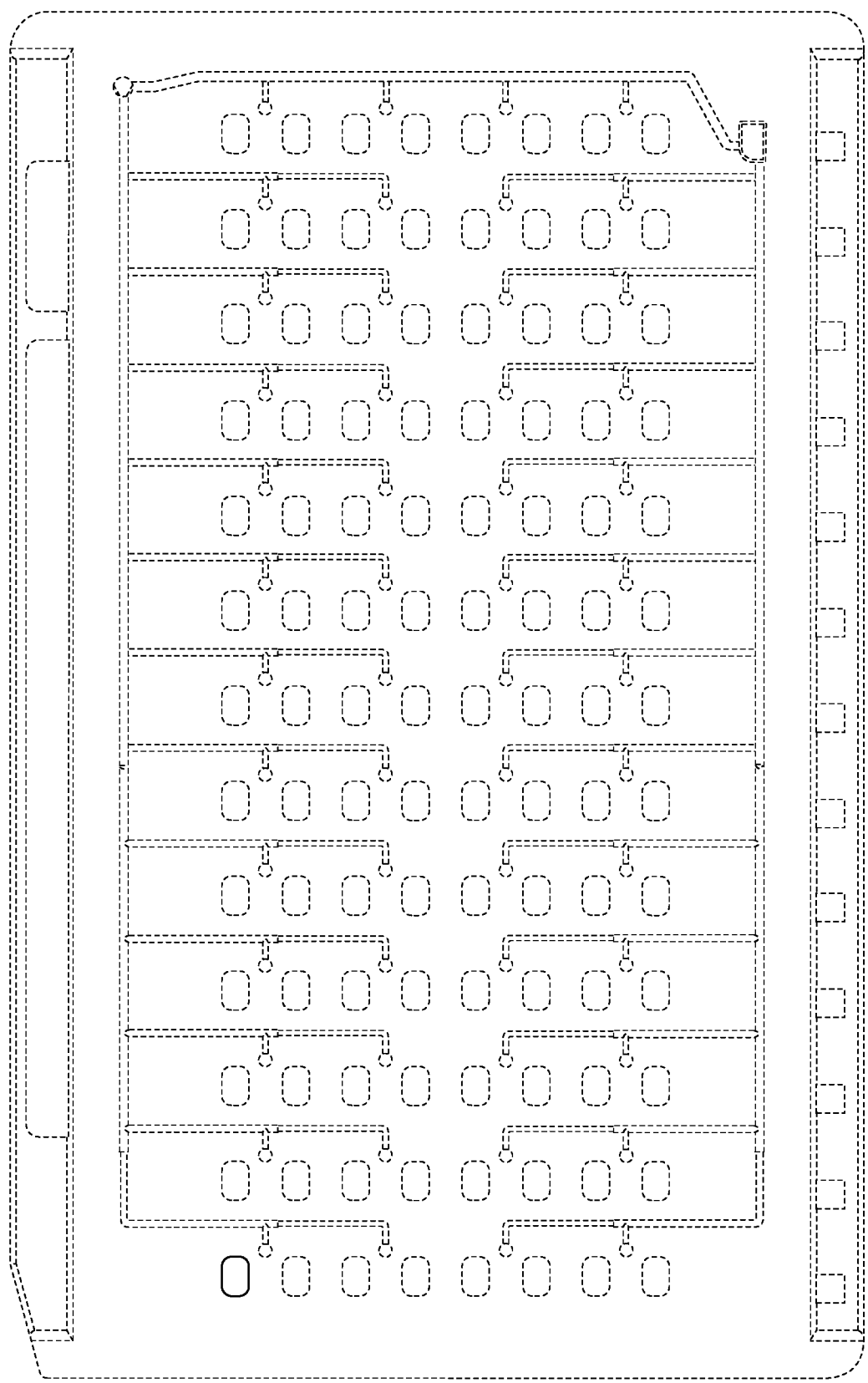
Figure 26:
Figure 27:
Figure 28:
Figure 29:
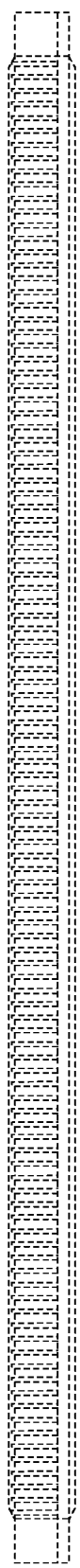
Figure 30:
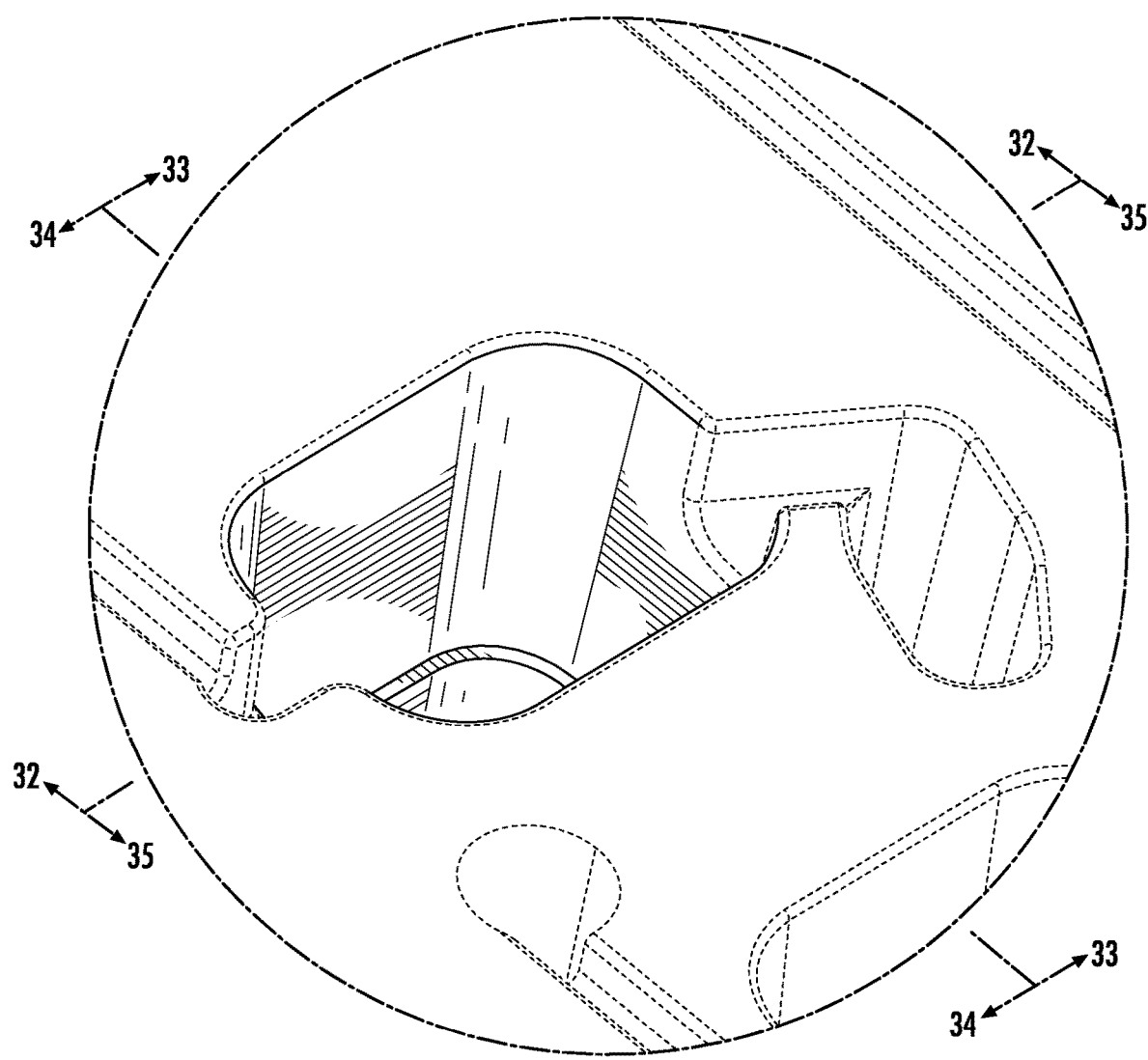
Figure 31:
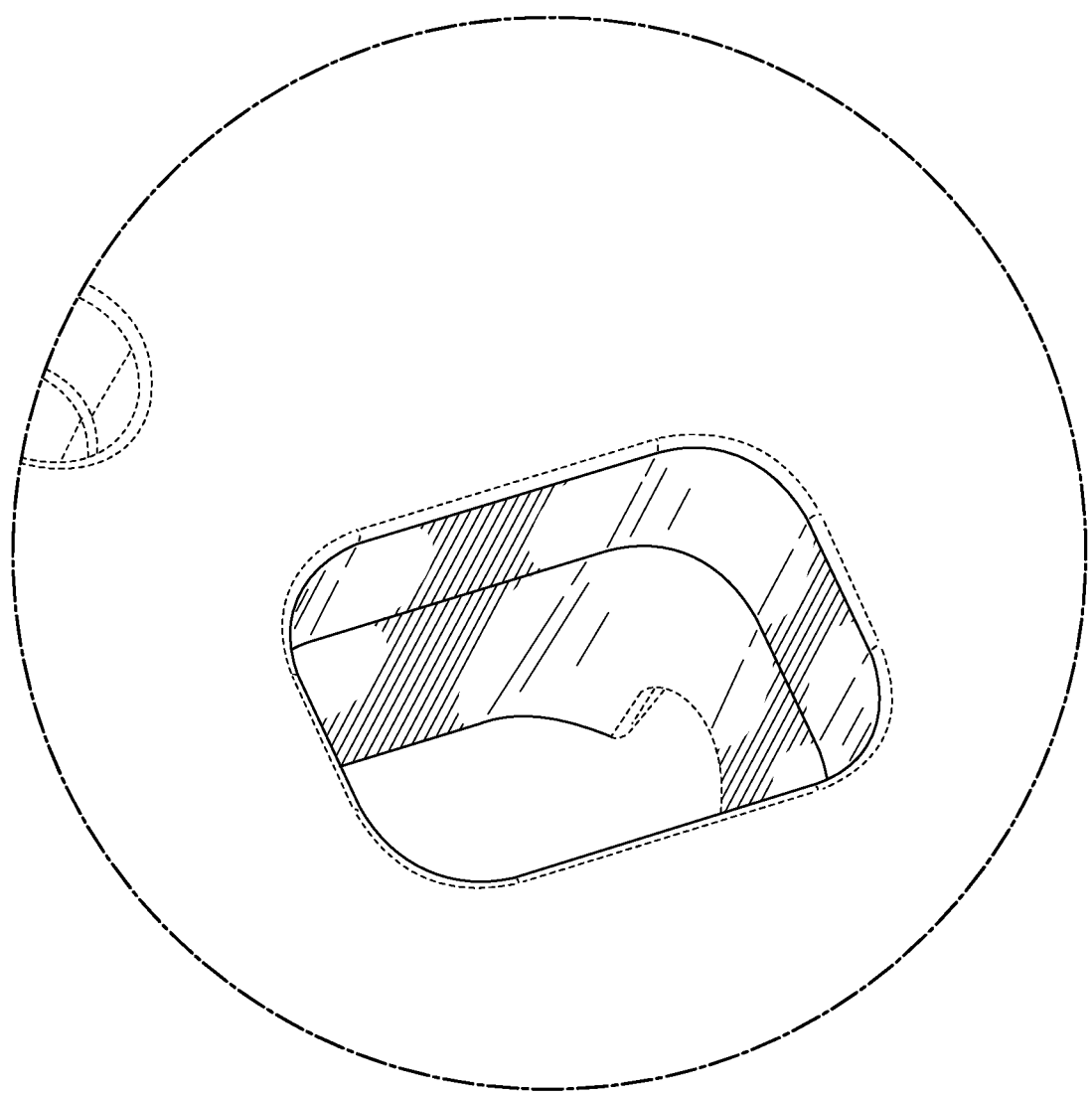
Figure 32:
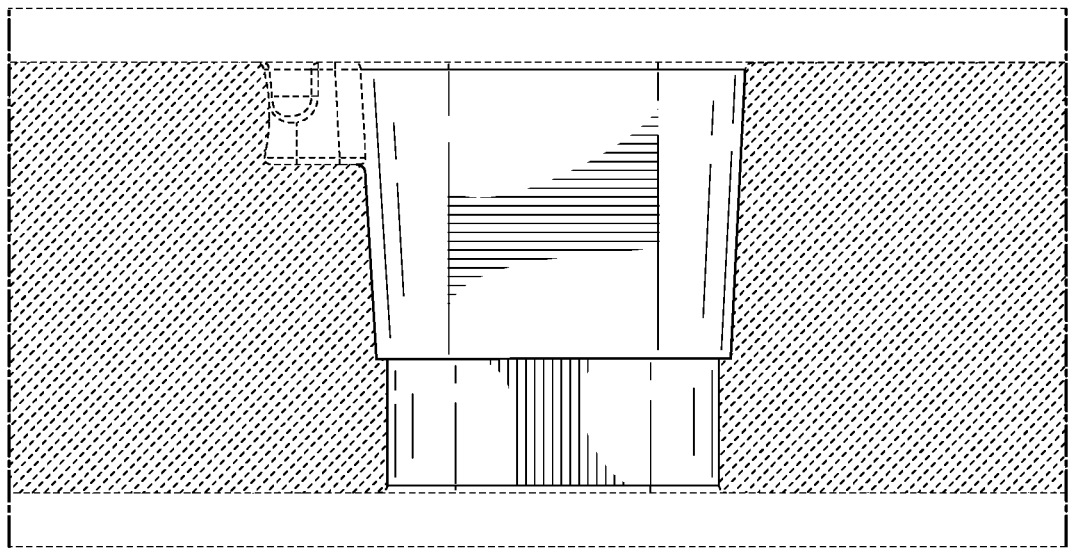
Figure 33:
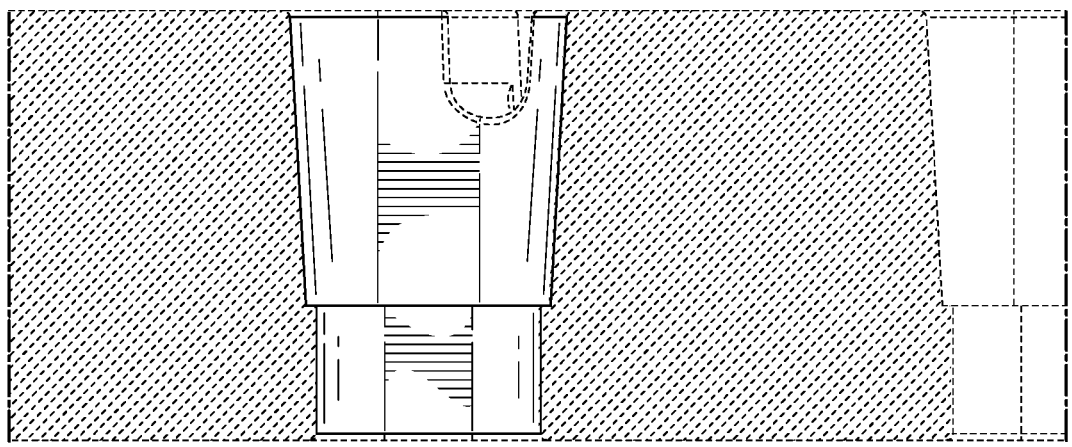
Figure 34:
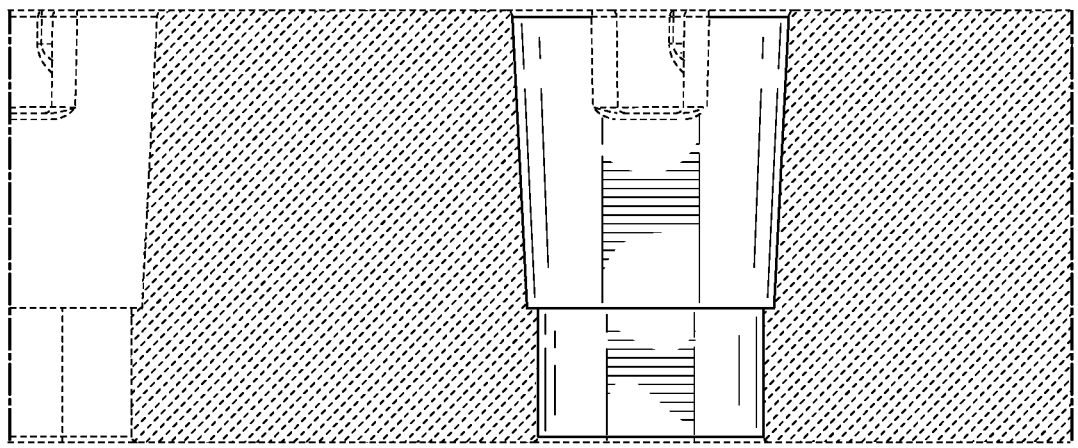
Figure 35:
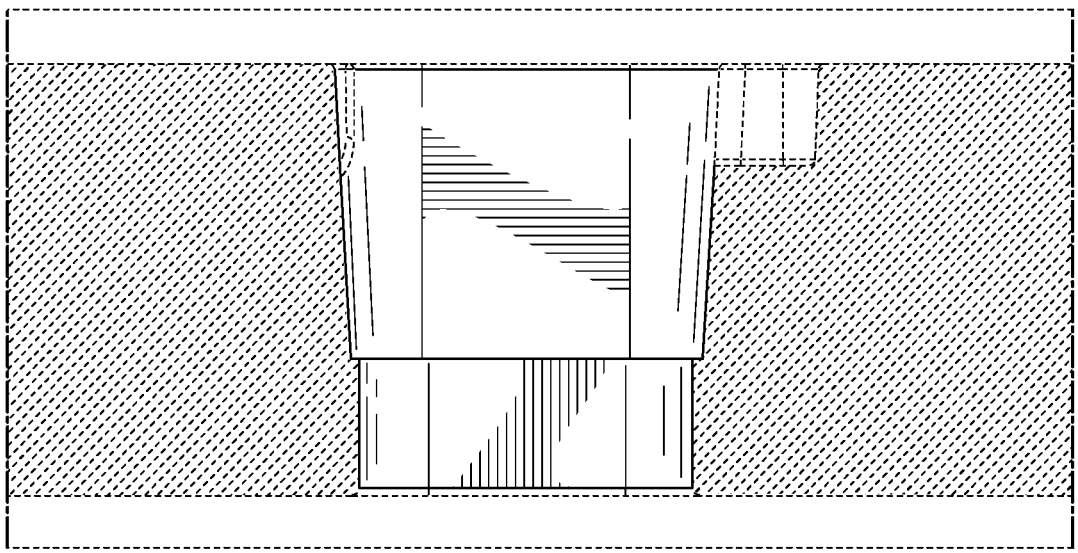
Figures 36, 44:
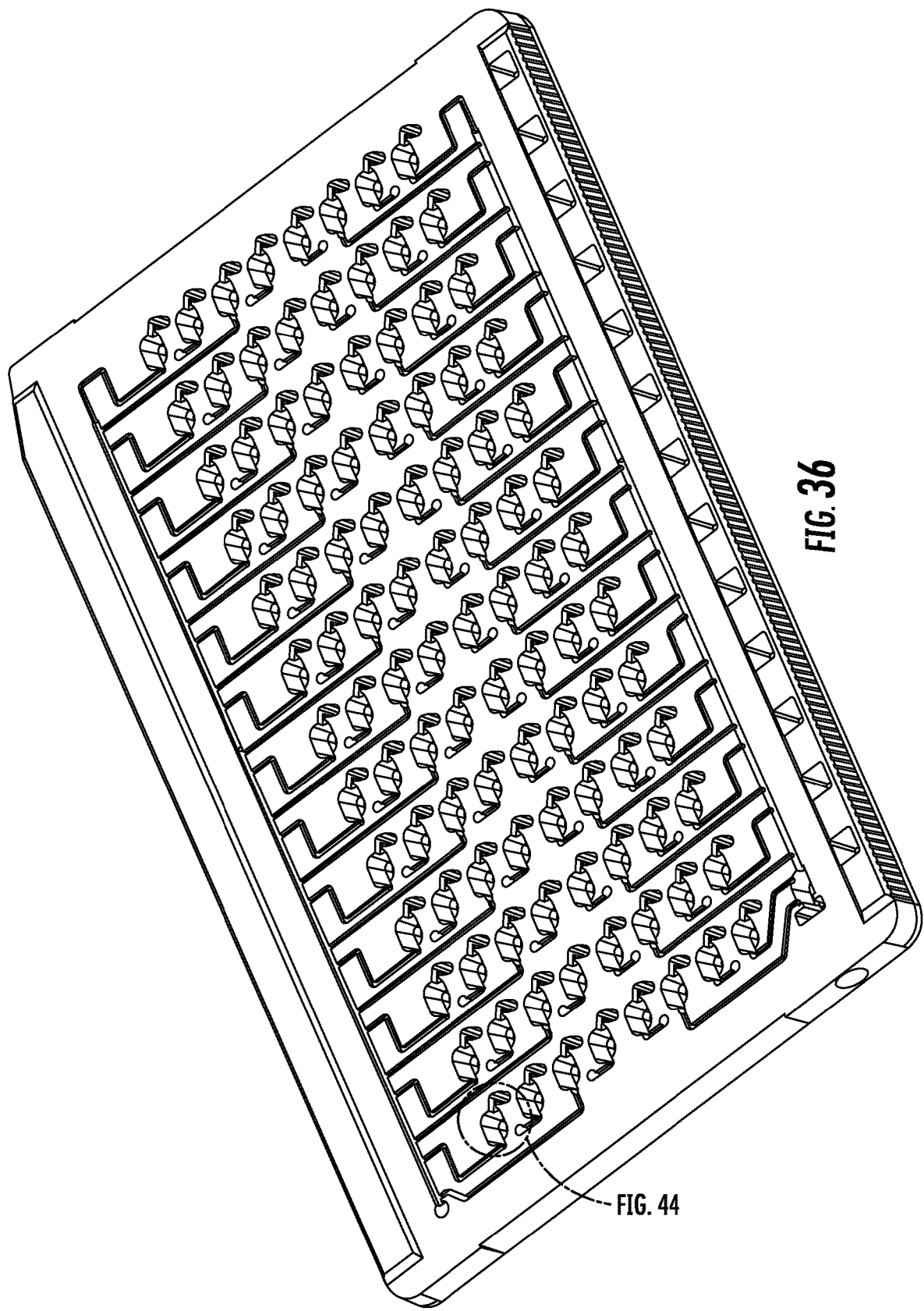
Figures 37, 45:
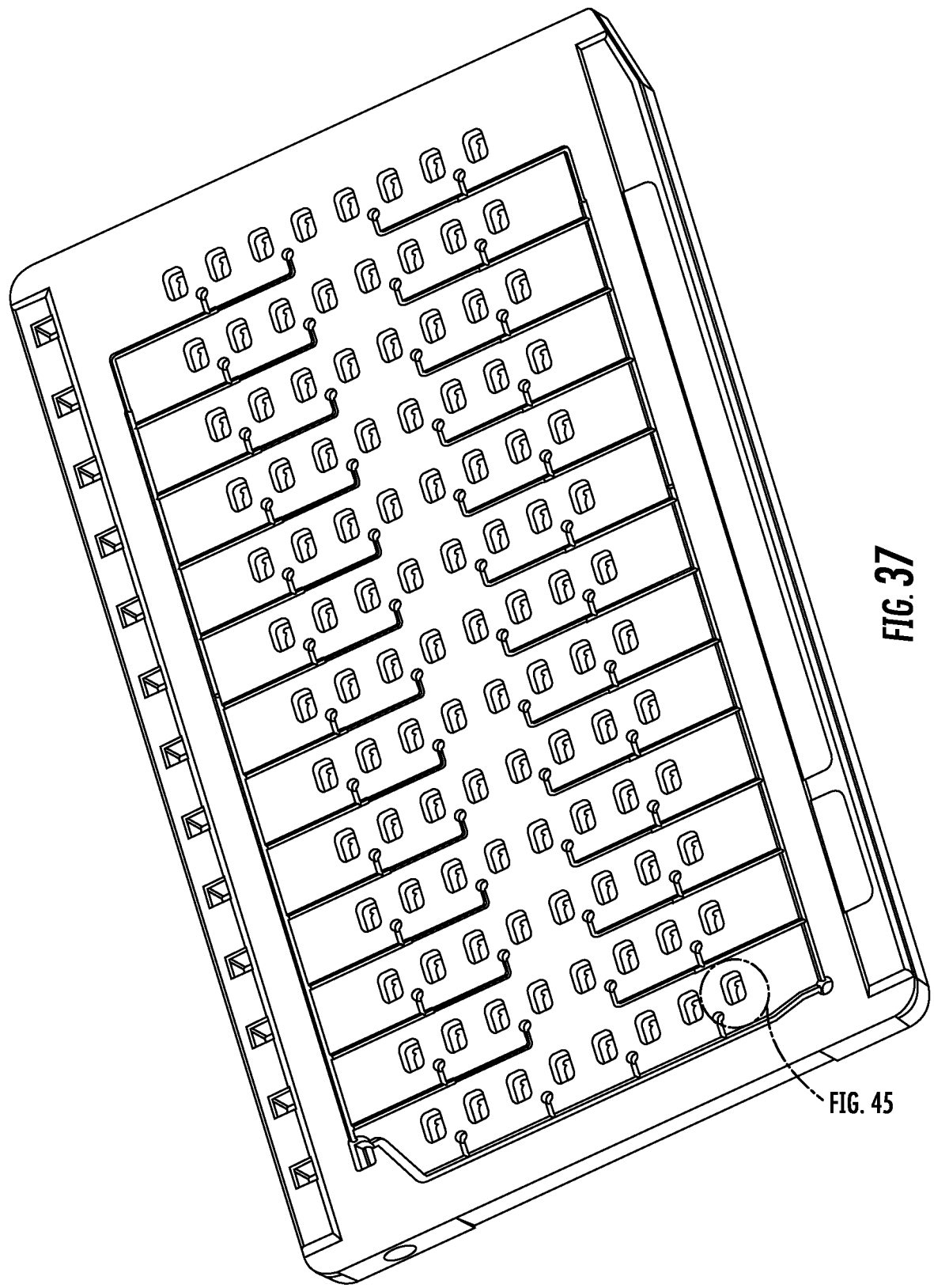
Figure 38:
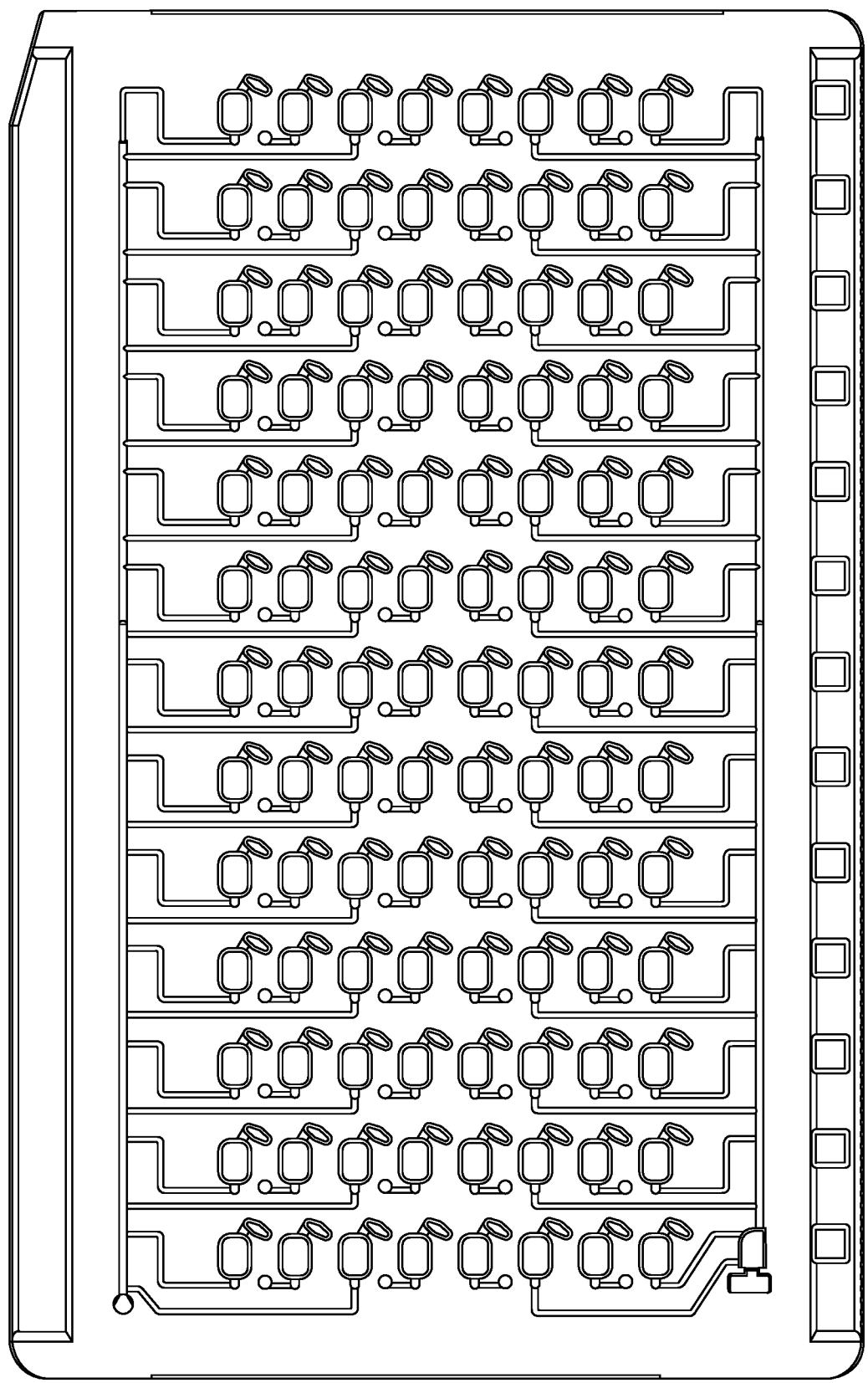
Figure 39:
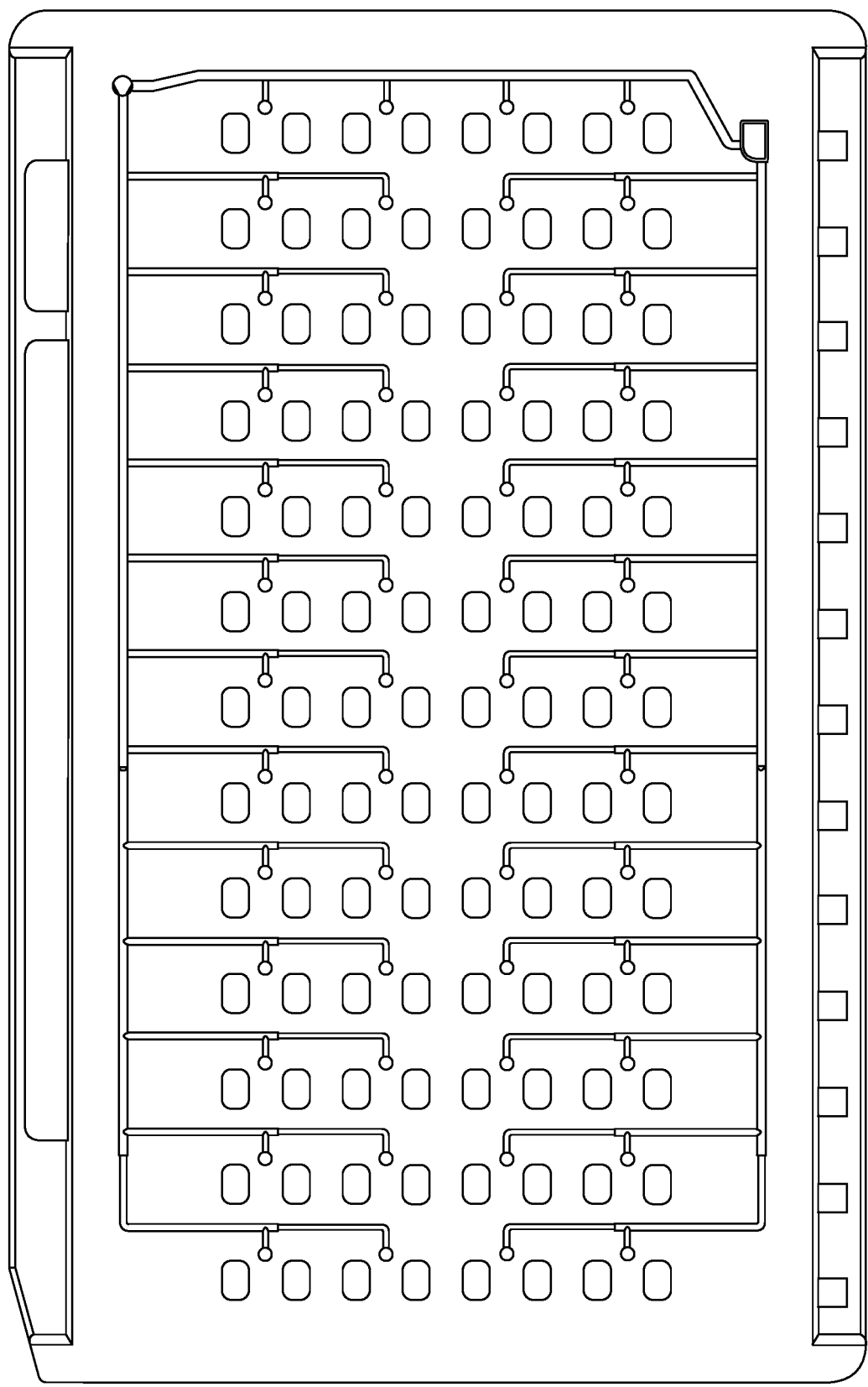
Figure 40:
Figure 41:
Figure 42:
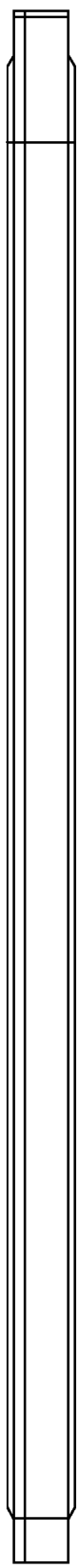
Figure 43:
Figure 44:
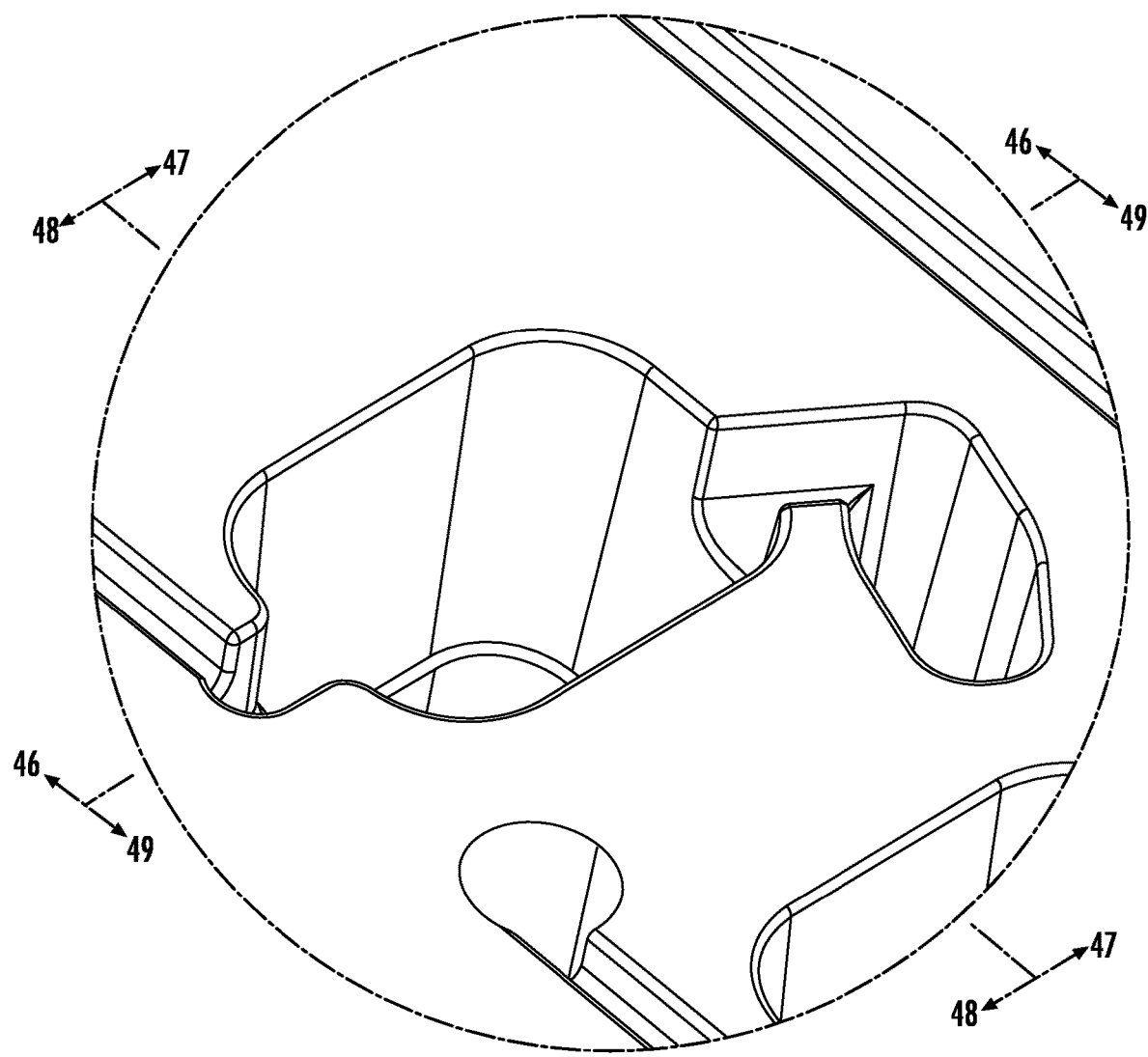
Figure 45:
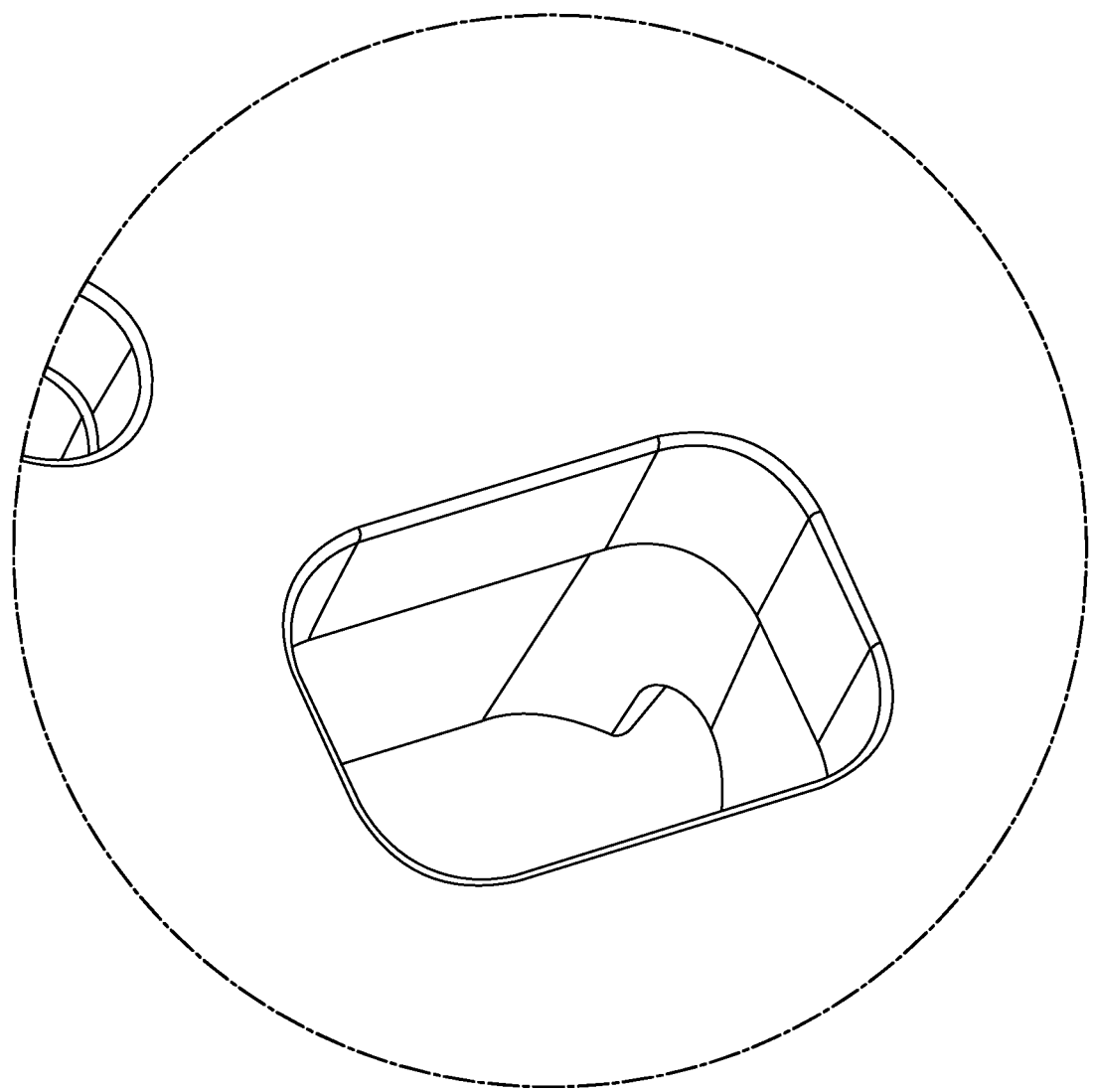
Figure 46:
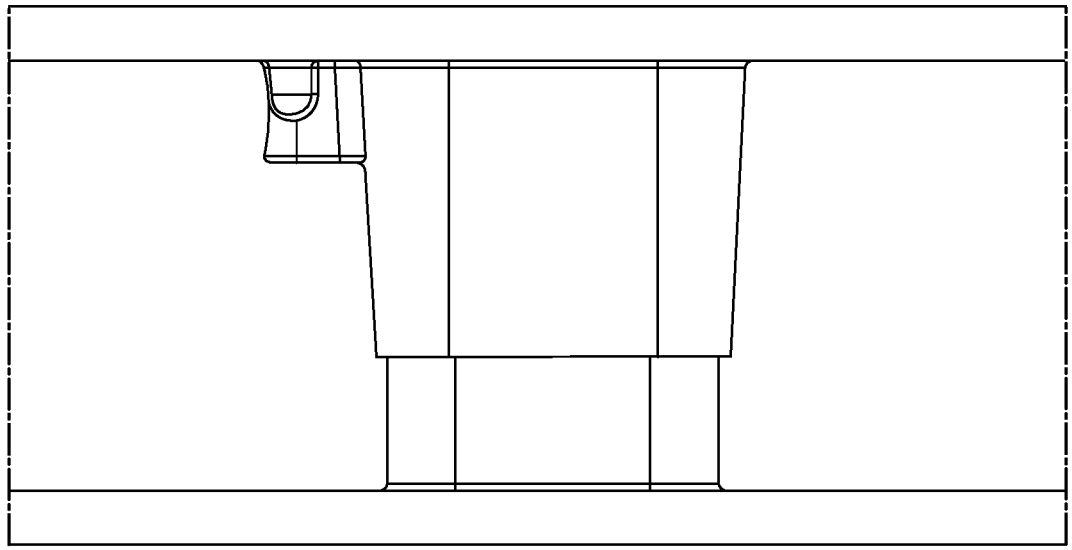
Figure 47:
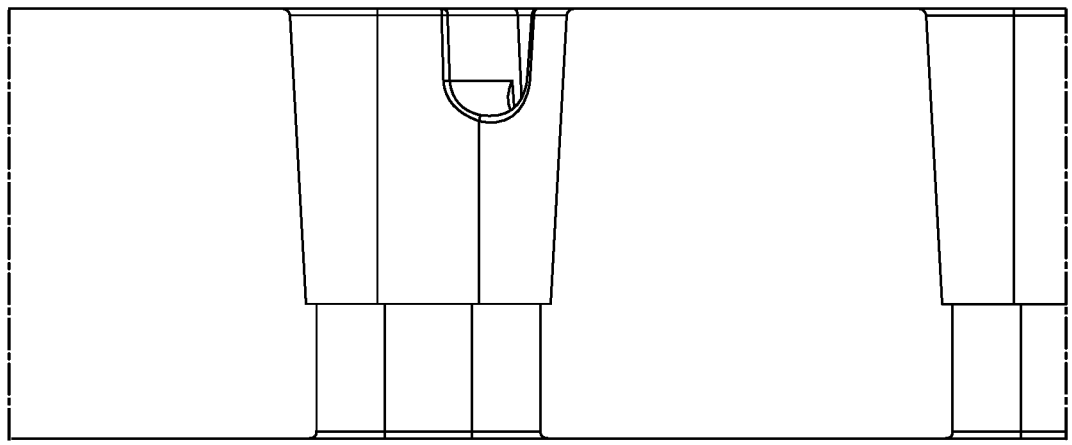
Figure 48:
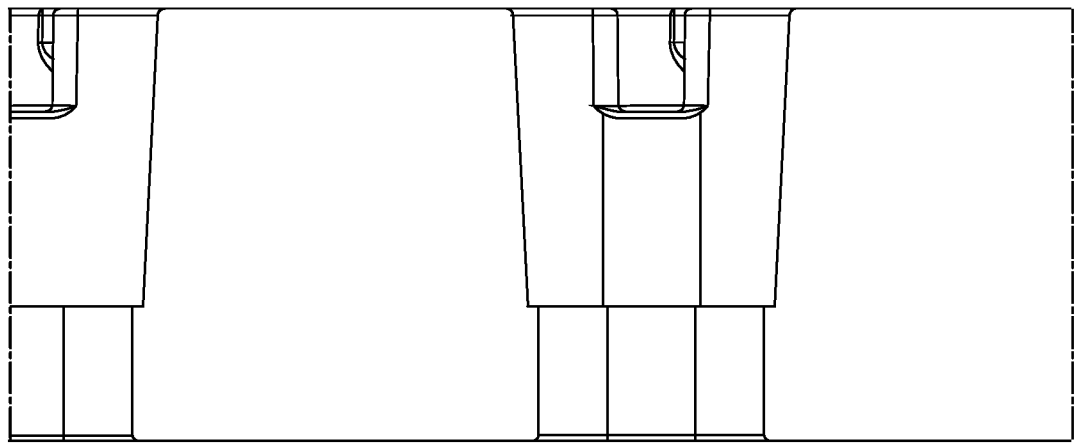
Figure 49:
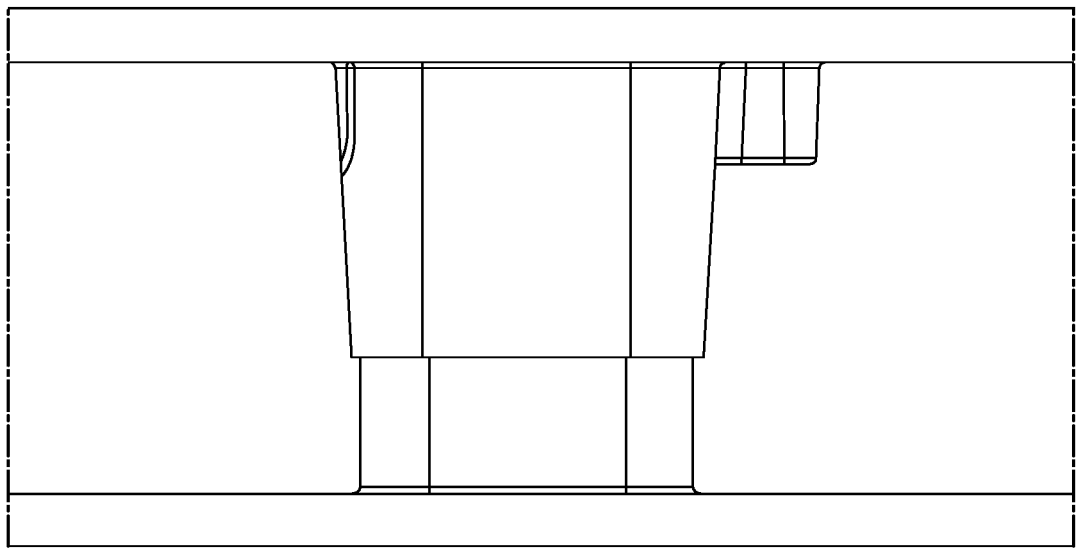

Having thus described the invention in general terms, reference will now be made to the accompanying drawings, which are not necessarily drawn to scale, and wherein:

FIG. 1 shows a front view of a test card according to some embodiments discussed herein;

FIG. 2 shows a perspective view of test card wells having a shelf according to some embodiments discussed herein;

FIG. 3 shows another perspective view of test card wells having a shelf according to some embodiments discussed herein;

FIG. 4 shows a perspective view of another configuration of the shelf in the well according to some embodiments discussed herein;

FIG. 5 shows a cross-sectional view of a test card well having a shelf according to some embodiments discussed herein;

FIG. 6 shows a mold plate for a test card according to some embodiments discussed herein;

FIGS. 7A-7E show various views of a well according to some embodiments discussed herein; and FIG. 8 is a front perspective view of a test card including 104 of the test card wells of FIGS. 2-3, according to some embodiments discussed herein;

FIG. 9 is a rear perspective view of the test card including the test card wells of FIGS. 2-3;

FIG. 10 is a front elevation view of the test card including the test card wells of FIGS. 2-3;

FIG. 11 is a rear elevation view of the test card including the test card wells of FIGS. 2-3;

FIG. 12 is a right side elevation view of the test card including the test card wells of FIGS. 2-3;

FIG. 13 is a left side elevation view of the test card including the test card wells of FIGS. 2-3;

FIG. 14 is a top plan view of the test card including the test card wells of FIGS. 2-3;

FIG. 15 is a bottom plan view of the test card including the test card wells of FIGS. 2-3;

FIG. 16 is a detail view of the test card including the test card wells of FIGS. 2-3 indicated in FIG. 8;

FIG. 17 is a detail view of the test card including the test card wells of FIGS. 2-3 indicated in FIG. 9;

FIG. 18 is a cross section of a portion thereof taken along line 18-18 in FIG. 16;

FIG. 19 is a cross section of a portion thereof taken along line 19-19 in FIG. 16;

FIG. 20 is a cross section of a portion thereof taken along line 20-20 in FIG. 16;

FIG. 21 is a cross section of a portion thereof taken along line 21-21 in FIG. 16;

FIG. 22 is a front perspective view of a test card including 104 of the test card wells of FIGS. 2-3, according to some embodiments discussed herein;

FIG. 23 is a rear perspective view of the test card including the test card wells of FIGS. 2-3;

FIG. 24 is a front elevation view of the test card including the test card wells of FIGS. 2-3;

FIG. 25 is a rear elevation view of the test card including the test card wells of FIGS. 2-3;

FIG. 26 is a right side elevation view of the test card including the test card wells of FIGS. 2-3;

FIG. 27 is a left side elevation view of the test card including the test card wells of FIGS. 2-3;

FIG. 28 is a top plan view of the test card including the test card wells of FIGS. 2-3;

FIG. 29 is a bottom plan view of the test card including the test card wells of FIGS. 2-3;

FIG. 30 is a detail view thereof indicated in FIG. 22;

FIG. 31 is a detail view thereof indicated in FIG. 23;

FIG. 32 is a cross section thereof taken along line 32-32 in FIG. 30;

FIG. 33 is a cross section thereof taken along line 33-33 in FIG. 30;

FIG. 34 is a cross section thereof taken along line 34-34 in FIG. 30;

FIG. 35 is a cross section thereof taken along line 35-35 in FIG. 30;

FIG. 36 is a front perspective view of a test card including 104 of the test card wells of FIGS. 2-3, according to some embodiments discussed herein;

FIG. 37 is a rear perspective view of the test card including the test card wells of FIGS. 2-3;

FIG. 38 is a front elevation view of the test card including the test card wells of FIGS. 2-3;

FIG. 39 is a rear elevation view of the test card including the test card wells of FIGS. 2-3;

FIG. 40 is a right side elevation view of the test card including the test card wells of FIGS. 2-3;

FIG. 41 is a left side elevation view of the test card including the test card wells of FIGS. 2-3;

FIG. 42 is a top plan view of the test card including the test card wells of FIGS. 2-3;

FIG. 43 is a bottom plan view of the test card including the test card wells of FIGS. 2-3f;

FIG. 44 is a detail view of a portion thereof indicated in FIG. 36;

FIG. 45 is a detail view of a portion thereof indicated in FIG. 37;

FIG. 46 is a cross section of a portion thereof taken along line 46-46 in FIG. 44;

FIG. 47 is a cross section of a portion thereof taken along line 47-47 in FIG. 44;

FIG. 48 is a cross section of a portion thereof taken along line 48-48 in FIG. 44; and FIG. 49 is a cross section of a portion thereof taken along line 49-49 in FIG. 44.

DETAILED DESCRIPTION

Some embodiments of the present invention will now be described more fully hereinafter with reference to the accompanying drawings, in which some, but not all embodiments of the inventions are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

The wells of sample test cards discussed herein are filled by putting the Vitek® card into a vacuum chamber. Both sides of the card are covered by the clear tape and a small straw or conduit is attached to the side of the card, a vacuum is then drawn and air is sucked out of the card through the straw which is in a test tube which contains the liquid sample. The vacuum is then released and the liquid is pushed into the wells thru the straw filling each well through channels which lead into each well in the card. The microorganisms in the samples may then be permitted to grow or reactions to proceed, generally over a period of up to a few hours, although the period varies with the type of bacteria or other substance analyzed and sample used. Each well contains dried chemicals that have been put in the card during a filling and drying process. Example instruments for reading the test cards and an incubation carousel for holding the cards are further described in U.S. Pat. Nos. 5,762,873; 5,888,455; 5,965,090; 6,024,921; 6,086,824; 6,136,270; 6,156,565; and 7,601,300, the contents of which are each incorporated herein by reference in their entireties. Example test cards are further described, for example, in U.S. Pat. Nos. 5,609,828; 5,746,980; 5,869,005; 5,932,177; 5,951,952; U.S. Pat. No. 414,272; U.S. Pat. Publ. Nos. US2012/0141325A1 and US2012/0088263A1, the contents of which are each incorporated herein by reference in their entireties.

Test cards may be used to hold a large number of samples for testing and analysis. Dedicated machines may automate all or a portion of the sample preparation, incubation, and analysis within the test cards. Traditional test cards may form bubbles in the wells when filled with the samples, which may degrade the resulting data. These bubbles may be caused by the chemical properties of the sample and the physical shape of the wells, which may combine to trap cavitated air inside the wells.

The sample test cards as described herein may have a generally rectangular shape and are in standard dimensions of from about 90 to about 95 mm in width, from about 55 to about 60 mm in height and from about 4 to about 5 mm in thickness. In one embodiment, the sample test cards of the present disclosure are about 90 mm wide, about 56 mm high and about 4 mm thick.

The test cards of described herein may comprise from 80 to 140 individual sample wells, or from about 96 to about 126 individual sample wells, each of which receives a test sample, for example a biological sample extracted from blood, other fluids, tissue or other material of a patient, for spectroscopic or other automated analysis. In other embodiments, the sample test cards may comprise 80, 88, 96, 104, 108, 112, 120, 126, 135 or 140 individual sample wells. In a specific embodiment, the sample test cards comprise 96 individual sample wells. In another specific embodiment, the sample test cards comprise 104 individual sample wells. In a further specific embodiment, the sample test cards comprise 112 individual sample wells. The sample wells are typically arranged in a series of horizontal rows and vertical columns and may comprise from about 8 to about 10 rows of from about 10 to about 16 columns of wells.

The sample wells may be present in various shapes and sizes. For example, in some embodiments, the wells 204 may be circular. In some embodiments, the wells 204 may be substantially circular. In some embodiments, the wells 204 may be rectangular. In some embodiments, the wells 204 may be substantially rectangular. In some embodiments, the wells 204 may be rectangular with curved corners (e.g., at a 0.5 mm radius of curvature as shown in the embodiment of FIG. 7A). In some embodiments, the wells 204 may be diamond shaped. In some embodiments, the wells 204 may be substantially diamond shaped. In some embodiments, the wells 204 may be oval shaped. In some embodiments, the wells 204 may be substantially oval shaped.

In some embodiments, the wells 204 may define a long dimension and a short dimension within the plane of the first surface. In the embodiment depicted in FIG. 7A, the long dimension is 2.550 mm and the short dimension is 1.750 mm. In some embodiments the long dimension may be 1 mm, 1.25 mm, 1.5 mm, 1.75 mm, 2 mm, 2.25 mm, 2.5 mm, 2.75 mm, 3 mm, 3.25 mm, 3.5 mm, 3.75 mm, 4 mm, 4.25 mm, 4.5 mm, 4.75 mm, 5 mm, 5.25 mm, 5.5 mm, 5.75 mm, 6 mm, 6.25 mm, 6.5 mm, 6.75 mm, 7 mm, 7.25 mm, 7.5 mm, 7.75 mm, 8 mm, 8.25 mm, 8.5 mm, 8.75 mm, 9 mm, 9.25 mm, 9.5 mm, 9.75 mm, or 10 mm. In some embodiments, the short dimension may be 1 mm, 1.25 mm, 1.5 mm, 1.75 mm, 2 mm, 2.25 mm, 2.5 mm, 2.75 mm, 3 mm, 3.25 mm, 3.5 mm, 3.75 mm, 4 mm, 4.25 mm, 4.5 mm, 4.75 mm, 5 mm, 5.25 mm, 5.5 mm, 5.75 mm, 6 mm, 6.25 mm, 6.5 mm, 6.75 mm, 7 mm, 7.25 mm, 7.5 mm, 7.75 mm, 8 mm, 8.25 mm, 8.5 mm, 8.75 mm, 9 mm, 9.25 mm, 9.5 mm, 9.75 mm, or 10 mm.

In some embodiments, the wells 204 may define a thickness extending between the first surface and the second surface. In the embodiment depicted in FIG. 7C, the thickness is 3.2 mm. In some embodiments, the thickness may be 1 mm, 1.25 mm, 1.5 mm, 1.75 mm, 2 mm, 2.25 mm, 2.5 mm, 2.75 mm, 3 mm, 3.25 mm, 3.5 mm, 3.75 mm, 4 mm, 4.25 mm, 4.5 mm, 4.75 mm, 5 mm, 5.25 mm, 5.5 mm, 5.75 mm, 6 mm, 6.25 mm, 6.5 mm, 6.75 mm, 7 mm, 7.25 mm, 7.5 mm, 7.75 mm, 8 mm, 8.25 mm, 8.5 mm, 8.75 mm, 9 mm, 9.25 mm, 9.5 mm, 9.75 mm, or 10 mm.

The biological sample may be a direct sample from the patient, or be a patient sample which is extracted, diluted, suspended, or otherwise treated, in solution or otherwise. The sample test cards of the present invention are generally used in a landscape orientation.

The test cards may be made of polystyrene, PET, or any other suitable plastic or other material. The test cards may be tempered during manufacture with a softening material, so that crystalline rigidity, and resultant tendency to crack or chip, is reduced. Test cards for instance may be manufactured out of a blend of polystyrene, approximately 90% or more, along with an additive of butyl rubber to render the card slightly more flexible and resistant to damage. In some embodiment, the test cards may also be doped with coloring agents, for instance titanium oxide to produce a white color, when desired.

The test cards described herein may be of use in identifying and/or enumerating any number of microorganisms, such as bacterial and/or other biological agents. Many bacteria lend themselves to automated spectroscopic, fluorescent and similar analysis after incubation, as is known in the art. The transmission and absorption of light is affected by the turbidity, density and calorimetric properties of the sample. Fluorescent reactions may be performed as well, independently or along with spectroscopic or other measurements. If fluorescent data are gathered, use of a coloring agent in test cards may be preferred, since an opaque card reduces or eliminates the scattering of fluorescent emissions throughout the card, as can occur with a translucent material. Other types of detection and analysis can be done on the test cards, including testing of susceptibility of microorganisms to antibiotics of different types, and at different concentrations, so that the test cards are general-purpose.

With reference to FIG. 1, a front view of an embodiment of a test card 202 is shown having a plurality of sample wells 204. The test card 202 may have a first or front surface 206 and a second or rear surface (shown in FIGS. 5, 7B, and 7C), opposite said front surface 206, a first or leading side edge 210, a second or trailing side edge 212, a top edge 214, and a bottom edge 216. As shown in FIG. 1, the test card 202 may comprise 96 individual sample wells arranged in twelve columns of eight sample wells 204. As the test fluid (i.e., patient sample or other solution) enters intake port it collects in intake reservoir 222 and travels along a distribution channel 230 that leads away from the intake reservoir. The distribution channel 230 comprises a relatively long channel, which weaves across the front surface 206 of the test card 202 among a plurality of columns of sample wells 204. As shown, the distribution channel 230 extends first horizontally across the top of a first column of sample wells 204 and then vertical down the front surface 206 of the test card 204 (or descending) (i.e., descending branch 232) between parallel sets or columns of sample wells 204, each column comprising eight vertical sample wells 204. At the bottom of the first descending branch 232, the distribution channel 230 comprises a traversing branch 234, which transverses in a horizontal manner across the surface of the card 202. The distribution channel 230 then extends vertically up (or ascends) the front surface 206 of the test card 202 (i.e., ascending branch 233) between a second set of columns of sample wells 204. At the top of the second set of sample well columns, the distribution channel 230 comprises a another traversing branch 234, which traverses in a horizontal manner across the surface of the card to the top of a third set of sample well columns and then extends vertically down or descends down (i.e., descending branch 232) between the columns of sample wells 204. This pattern of alternating descending 232 and ascending 233 branches of the distribution channel, interconnected with traversing channel branches 234, continues across the front surface 206 of the test card 202, thereby allowing the distribution channel 230 to weave between all the vertically arranged sample well columns on the test card 202. In one embodiment the first distribution channel 230 may comprises a fluid flow channel having a width of about 0.5 mm and a depth of about 0.5 mm (i.e., a cross section of approximately 0.25 mm).

Fill channels 236 may be relatively short channels (which may be kinked) that extend from the distribution channels 230 to the sample wells 204, and function to connect, and thereby fill the individual sample wells 204 of test card 202. In one embodiment, fill channels 236 may comprise a fluid flow channel having a width of about 0.2 to about 0.4 mm and a depth of about 0.3 to about 0.5 mm (i.e., a cross section of about 0.06 to 0.2 mm$^2$. In another embodiment, the fill channels 234 have a width of about 0.3 mm and a depth of about 0.4 mm (i.e., a cross section of about 0.12 mm$^2$). In addition to the shelf, detailed below, the test card may include a bubble trap 250 and connected channel 252 to receive any bubbles that are prevented from sticking in the well by the shelf. The test cards 202 of this design concept may also comprise a series of sensor stop holes 260, a barcode or other data marking (not shown), a tapered bezel edge 270, and/or lower and upper rails 280, 282, optionally with associated leading lip 284 or trailing truncation 286.

With reference to FIGS. 2-3, the depicted embodiment includes a shelf 300 extending into an opening 310 of the wells 204. The opening 310 of the wells 204 may extend from the first, front surface 206 to the second, rear surface 207 (shown in FIGS. 5, 7B, and 7C) of the card 202. The opening 310 of the wells 204 may be defined by a wall 320 extending from the first surface 206 to the second surface 207. The wall 320 may include a first portion 322 defined between the shelf 300 and the first surface 206, and a second portion 324 defined between the shelf 300 and the second surface 207 (shown in FIGS. 5, 7B, and 7C), such that the shelf 300 forms the junction between the first and second portions of the wall. The test card 202 may include any form of supply conduit 290 and bubble trap 250.

With reference to FIG. 4, another embodiment of the well 204 shown in FIG. 3 is depicted. In the embodiment of FIG. 4, the shelf 300 is formed only at a portion of the wall 320 beneath the supply conduit 290, with the remaining areas of the wall being substantially flat between the first portion 322 and second portion 324. The shelf 300 may otherwise include the same properties, dimensions, and features of the shelves discussed herein. For example, the shelf 300 shown in FIG. 4 may include the same cross section shown in any of FIGS. 5 and 7B-7C, albeit only at the portion of the wall 320 beneath the supply conduit 290, with the first portion 322 of the wall above the shelf being wider than the second portion 324 below the shelf. As in the embodiments discussed herein, the opening 310 in a plane of the second portion 324 may be narrower than at a plane of the first portion 322 at all axial positions (e.g., along axis A shown in FIG. 5).

With continued reference to FIG. 4, the depicted shelf 300 may include rounded edges that join with the wall 320 as shown. In some embodiments, the shelf 300 may be disposed only under the supply conduit 290 (e.g., directly in line with the supply conduit in the axial A direction). In some embodiments, the shelf 300 may include a constant width in portions directly under the supply conduit 290 and may curve or taper to flush with the wall 320 on either side of the supply conduit. In some embodiments, the shelf 300 may be disposed on one surface of the wall 320 of the well 204 (e.g., in embodiments having a rectangular or substantially rectangular shape, the shelf may be disposed on one of the four sides of the well).

With reference to FIG. 5, a cross-sectional view of a well 204 in a simplified test card 202 is shown. The well 204 includes an opening 310 bounded by a wall 320 having a first portion 322 and a second portion 324 as described above. In some embodiments, the well 204 may include a shelf 300 extending into the opening 310. The shelf 300 may define a shelf surface 330 that projects towards the center of the opening. The shelf 300 may extend substantially laterally (e.g., the shelf surface 330 may be defined in a plane perpendicular to a longitudinal axis A of the opening 310 and parallel to the first 206 or second 207 surfaces) to change the internal cross section of the well 204 when moving in the longitudinal direction A. In such embodiments, a vector normal to the shelf surface 330 may be oriented in the longitudinal direction A.

The shelf 300 may cause the second portion 324 of the wall 320 to have a smaller cross-sectional area than the first portion 322 of the wall, when taken relative to a plane that is perpendicular to the longitudinal axis A (e.g., a plane parallel to either the first 206 or second 207 surface). Said differently, the opening 310 is narrower in the portion 324 below the shelf 300 than the portion 322 above the shelf. In use, the narrower portion 324 may be positioned gravitationally downward of the wider portion 322 of the wall 320 and opening 310 to prevent bubbles from catching on the wall. In such embodiments, bubbles may be released from the well 204 and captured in the bubble trap 250 (shown in FIGS. 1-4, 7A, 7D, and 7E). In some embodiments, the wall 304 may substantially only decrease in cross-sectional area and/or diameter when moving downward (e.g., along the longitudinal axis A from the first surface 206 to the second surface 207). Maintaining an opening 310 that only widens when the bubbles are floating from proximate the second surface 207 towards the first surface 206 prevents any pinch points that would retain the bubbles within the well 204, and the shelf 300 described herein encourages and causes the bubbles to release.

As used herein, the terms "substantially" or "approximately" indicate that the accompanying dimension need not be achieved with mathematical precision, but rather, that the specified dimension is accomplished to a standard margin of error within manufacturing tolerances and physical limits as would be appreciated by a person of ordinary skill in the art. For example, the edges of the wells may be called "approximately 90 degrees" despite limitations on molding and pressing technology requiring the edges to be slightly rounded. Similarly, the opening 310 may not substantially widen when travelling downward in the longitudinal direction A from the first surface 206 toward the second surface 207; however, this does not preclude the aforementioned rounded edges from curving inward slightly within manufacturing limits.

In some embodiments, the shelf 300 may be positioned at any vertical location (e.g., at any point along the longitudinal axis A) within the well 204. In some embodiments, the shelf 300 may be positioned below the midway point (e.g., closer to the second surface 207 than the first surface 206) of the well 204. In some further embodiments, the shelf 300 may be positioned at any increment along the longitudinal direction (e.g., ⅛, ¼, ⅓, ⅜, ½, ⅝, ⅔, ¾, ⅞, or any sub-increment thereof) of the well 204.

The shelf 300 may project into the opening 310 sufficiently to prevent bubbles from adhering to the wall 320. In some embodiments, the shelf 300 may extend at a radial width of 0.035 mm (0.0014 in) into the well 204 (e.g., dimension B, in a direction perpendicular to the longitudinal axis A). In some embodiments, the shelf may extend at a radial width of 0.035 mm (0.0014 in) or greater into the well 204 (e.g., dimension B, in a direction perpendicular to the longitudinal axis A). In some embodiments, the shelf 300 may extend at a radial width of 0.05 mm (0.0020 in) into the well 204 (e.g., dimension B, in a direction perpendicular to the longitudinal axis A). In some embodiments, the shelf 300 may extend at a radial width of 0.05 mm (0.0020 in) or greater into the well 204 (e.g., dimension B, in a direction perpendicular to the longitudinal axis A). In some embodiments, the shelf 300 may extend at a radial width of 0.05 mm (0.0020 in) or less into the well 204 (e.g., dimension B, in a direction perpendicular to the longitudinal axis A). In some embodiments, the shelf 300 may extend radially from 0.035 mm (0.0014 in) to 0.05 mm (0.0020 in) into the well 204 (e.g., dimension B, in a direction perpendicular to the longitudinal axis A).

In the embodiments detailed herein, the width of the opening 310 at the first portion 322 of the wall 320 may differ from the width of the opening at the second portion 324 of the wall by the combined widths of the shelf on either side of the well, as applicable. For example, in embodiments having a 0.035 mm (0.0014 in) wide shelf 300 extending entirely circumferentially around the well 204, the second portion 324 immediately below the shelf 300 is 0.07 mm (0.0028 in) narrower than the first portion 322 immediately above the shelf for every cross-sectional plane extending between the first surface and the second surface (e.g., every axis perpendicular to the longitudinal axis A). Similarly, in embodiments having a 0.05 mm (0.0020 in) wide shelf 300 extending entirely circumferentially around the well 204, the second portion 324 immediately below the shelf 300 is 0.1 mm (0.0040 in) narrower than the first portion 322 immediately above the shelf for every cross-sectional plane extending between the first surface and the second surface (e.g., every axis perpendicular to the longitudinal axis A). Thus, for example, in embodiments having a radial width of 0.035 to 0.05 mm, the width of the opening 310 may differ by 0.07 to 0.1 mm above and below the shelf. The area may similarly be determined from the dimensions of the well detailed herein. In embodiments having a shelf 300 only on one portion of the wall (e.g., as shown in FIG. 4), the width may only differ by 1× the radial widths detailed herein.

In some embodiments, the extension of the shelf 300 may be measured as the difference in radius above and below the shelf 300 for a given angular position relative to the longitudinal axis A. In some embodiments, the wells 204 may be circular, and in some embodiments, the wells 204 may be non-circular (e.g., substantially rectangular or oval-shaped). In some embodiments, the shelf 300 may extend into the opening 310 uniformly about the circumferential direction (e.g., circumferentially around the longitudinal axis A), such that the difference in radius between the first portion 322 and second portion 324 of the wall 320 is constant. In some embodiments, the shelf 300 may not be uniform, and the radius between the first portion 322 and second portion 324 of the wall 320 may vary with angular position.

In some embodiments, the shelf 300 may extend into the opening 310 only at select sections of the well 204. For example, in some embodiments, the shelf 300 may be positioned directly below the supply conduit 290. In some embodiments, the shelf 300 may be positioned across the well 204 from the supply conduit 290. In such embodiments, the wall 310 may have a substantially constant radius in the longitudinal direction A elsewhere without any shelf. In some embodiments, the shelf 300 may extend circumferentially around the entire opening 310.

With reference to FIG. 6, a mold plate 400 for manufacturing any of the test cards 202 described herein is shown. The mold plate 400 may include a first or second surface 406 corresponding to the first 206 or second 207 surface (shown in FIGS. 5, 7B, and 7C) (e.g., depending on which half of the mold is referenced). The mold plate 400 may further include a plurality of pins 410 that are shaped as the inverse of a portion of the opening 310. For example, in the embodiment shown in FIG. 6, a second mold plate, representing the second surface, is shown, and a top mold plate would include substantially the same pins, albeit with additional channeling as shown in FIGS. 1-5 and 7A-7E, having a different width.

During manufacturing, two mold plates 400 (e.g., a first mold plate and a second mold plate) may be aligned surface 406 to surface 406 with the ends of the pins 410 abutting one another. The pins 410 of the respective mold plates 400 may differ in size to create the shelf 300 (shown in FIGS. 2-5, and 7A-7E). In particular, the pins may differ by the exact shape of the desired shelf surface 330 dimensions, including each and every set of possible dimensions discussed above. For example, in an embodiment in which the shelf surface 330 extends between 0.035 mm and 0.05 mm into the opening 310, a first pin of a first mold plate may be the same 0.035 mm to 0.05 mm wider in radius than a second pin of a second mold plate. When the mold plates 400 are applied to the test card material, the shelf 300 is thereby formed at the parting line between mold halves, such that the shelf surface 330 is parallel to the ends of the pins of the mold plates. In some embodiments, the test cards 202 may be formed by injection molding between the two plates, by pressing a pliable material between the two plates, or by any other manufacturing technique.

Accordingly, during manufacturing, the test card 202 may be produced by aligning a first mold plate with a second mold plate. The first mold plate may include a first pin having a first shape corresponding to a portion of the well 204 extending from the shelf 300 to the first surface 206. Similarly, the second mold plate may include a second pin having a second shape corresponding to a portion of the well extending from the shelf to the second surface. The first pin may be narrower than the second pin, having the same dimensions between pins as the shelf 300 detailed above. Once aligned, the method may include molding the test card 202 between the first mold plate and the second old plates.

FIGS. 7A-7E show various views of a well according to some embodiments discussed herein. The dimensions depicted in FIGS. 7A-7E are represented in millimeters and the angles in degrees, and FIGS. 7A-7E are drawn to scale. FIG. 7A depicts a top plan view of the first surface of the card, showing a well 204 and bubble trap 250. FIG. 7B shows a cross-sectional view of the well 204 of FIG. 7A taken on the D1 axis. As shown in FIG. 7B, the shelf 300 is defined in the wall 320 of the well 204 with the first portion 322 extending to the first surface from the shelf and the second portion 324 extending to the second surface.

FIG. 7C shows a cross-sectional view of the well 204 of FIG. 7A taken on the D2 axis. In the depicted embodiment, the first portion 322 of the wall 320 slopes outwardly relative to the direction beginning at the shelf 300 and ending at the first surface by approximately 3 degrees. In some embodiments, the first portion may slope by 1 degree, 2 degrees, 4 degrees, 5 degrees, 6 degrees, 7 degrees, 8 degrees, 9 degrees, 10 degrees, 11 degrees, 12 degrees, 13 degrees, 14 degrees, 15 degrees, 16 degrees, 17 degrees, 18 degrees, 19 degrees, 20 degrees, 21 degrees, 22 degrees, 23 degrees, 24 degrees, or 25 degrees. With continued reference to FIG. 7C, the second portion 324 of the wall may have no slope, or may slope outwardly relative to the direction beginning at the shelf 300 and ending at the second surface by approximately 0.5 degrees. In some embodiments, the slope of the first portion 322 may help release bubbles. In some embodiments, the slope of the wall 320 may help release the card from the molds detailed herein. In embodiments having sloped wall portions, the second portion 324 may remain narrower (e.g., the distance across the opening being narrower) than any portion of the first portion 322 at each longitudinal and radial position of the opening 310. In embodiments having sloped wall portions, the second portion 324 may equal or become wider than the first portion 322 (e.g., the distance across the opening being equal or wider) as the second portion approaches the second surface. In each of the aforementioned embodiments, the shelf 300 may protrude outwardly such that the opening 310 is wider at the first portion 322 immediately adjacent the shelf 300 than the second portion 344 immediately adjacent the shelf regardless of slope.

With continued reference to FIG. 7C, the card may be approximately 3.2 mm (0.126 inches) thick. In some embodiments, as discussed above, the shelf 300 may be disposed at a mid-point in the thickness (e.g., halfway between the first surface and the second surface). In the depicted embodiment, the shelf 300 is positioned 1 mm (0.039 inches) from the second surface and 2.2 mm (0.087 inches) from the first surface, being 31.25% of the thickness from the second surface. In some embodiments, the shelf 300 may be disposed one third of the thickness from the second surface and two thirds of the thickness from the first surface. In some further embodiments, the shelf 300 may be positioned at any increment along the longitudinal direction (e.g., ⅛, ¼, ⅓, ⅜, ½, ⅝, ⅔, ¾, ⅞, or any sub-increment thereof) of the well 204.

With reference to FIG. 7D, a zoomed top view of the area D3 in FIG. 7A is shown. The bubble trap 7D may include the depicted dimensions and orientation relative to the well 204 and channel 252. With reference to FIG. 7E, a cross-sectional view of the bubble trap 250 is shown taken along axis D4 in FIG. 7D. As shown in FIGS. 7D-7E, the walls of the bubble trap 250 may slope outwardly relative to the direction oriented towards the first surface at, for example, 3 degrees. The bubble trap 250 may terminate within the card and may stop short of the second surface.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation

The invention claimed is:

1. A test card comprising:
 a body comprising a first surface and a second surface opposite the first surface, the body defining at least one liquid supply conduit and at least one intake port, wherein the at least one intake port fluidically connects the at least one supply conduit with an exterior of the test card;
 at least one well defining an opening extending from the first surface to the second surface and configured to receive a sample therein; wherein the at least one well comprises:
  a wall bounding the opening and extending between the first surface and the second surface of the card;
  a shelf defined by the wall, wherein a first portion of the wall extends from the shelf surface to the first surface and a second portion of the wall extends from the shelf surface to the second surface, and wherein the shelf protrudes from the first portion of the wall and connects the first portion of the wall to the second portion of the wall, and wherein the opening is narrower between the shelf and the second surface than between the shelf and the first surface, the shelf further defining a shelf surface substantially parallel to the first surface or the second surface; and
  a supply conduit opening defined in the wall at a position above at least a portion of the shelf such that the supply conduit opening and the at least the portion of the shelf are aligned circumferentially relative to the at least one well, the supply conduit opening connecting the at least one liquid supply conduit with the at least one well such that the at least one well is fluidically connected to the at least one intake port.

2. The test card of claim 1, wherein a first distance between the shelf and the first surface is greater than the distance between the shelf and the second surface.

3. The test card of claim 1, wherein the shelf surface defines a radial width from 0.035 mm to 0.05 mm, wherein the radial width is defined in a direction parallel to the first surface or the second surface.

4. The test card of claim 1, wherein the shelf extends circumferentially about the opening within the at least one well.

5. The test card of claim 1, wherein the at least one well comprises a plurality of wells.

6. The test card of claim 5, wherein the at least one well comprises 104 wells.

7. The test card of claim 5, wherein the at least one intake port comprises one intake port; wherein each of the plurality of wells comprises a distinct supply conduit opening, including the supply conduit opening associated with a first well; and wherein each distinct supply conduit opening is fluidically connected to the one intake port.

8. The test card of claim 1, wherein the supply conduit opening is disposed closer to the first surface than the shelf.

9. The test card of claim 1, wherein the opening extends entirely through the body, such that the opening is configured to allow light to travel through the body, the test card further comprising:
- a first clear sealing membrane disposed on the first surface of the body, wherein the first clear sealing membrane is configured to cover the opening at the first surface, and
- a second clear sealing membrane disposed on the second surface of the body, wherein the second clear sealing membrane is configured to cover the opening at the second surface.

10. The test card of claim 1, further comprising a bubble trap connected to the at least one well via a channel, wherein the channel is connected to the at least one well at the first portion.

11. A method of manufacturing a test card, the test card comprising a body comprising a first surface and a second surface opposite the first surface, the body defining at least one liquid supply conduit and at least one intake port, wherein the at least one intake port fluidically connects the at least one supply conduit with an exterior of the test card, at least one well defining an opening extending from the first surface to the second surface and configured to receive a sample therein; wherein the at least one well comprises: a wall bounding the opening and extending between the first surface and the second surface of the card; a shelf defined by the wall, wherein a first portion of the wall extends from the shelf surface to the first surface and a second portion of the wall extends from the shelf surface to the second surface, and wherein the shelf protrudes from the first portion of the wall and connects the first portion of the wall to the second portion of the wall, and wherein the opening is narrower between the shelf and the second surface than between the shelf and the first surface, the shelf further defining a shelf surface substantially parallel to the first surface or the second surface; and a supply conduit opening defined in the wall at a position above at least a portion of the shelf such that the supply conduit opening and the at least the portion of the shelf are aligned circumferentially relative to the at least one well, the supply conduit opening connecting the at least one liquid supply conduit with the at least one well such that the at least one well is fluidically connected to the at least one intake port; the method comprising:
- aligning a first mold plate with a second mold plate, wherein the first mold plate includes a first pin having a first shape corresponding to a portion of the at least one well extending from the shelf to the first surface, wherein the second mold plate includes a second pin having a second shape corresponding to a portion of the at least one well extending from the shelf to the second surface, and wherein the first pin is wider than the second pin; and
- molding a test plate between the first mold plate and the second mold plate.

12. The method of claim 11, wherein the shelf is created at the intersection of the first mold plate and the second mold plate.

13. The method of claim 11, wherein the at least one well comprises a plurality of wells.

14. A test card comprising:
- a body comprising a first surface and a second surface opposite the first surface, the body defining at least one liquid supply conduit and at least one intake port, wherein the at least one intake port fluidically connects the at least one supply conduit with an exterior of the test card;
- at least one well defining an opening configured to receive a sample therein, the opening extending from the first surface to the second surface entirely through the body, such that the opening is configured to allow light to travel through the body;
  wherein the at least one well comprises:
  - a wall bounding the opening and extending between the first surface and the second surface of the card;
  - a shelf defined by the wall, wherein the opening is narrower between the shelf and the second surface than between the shelf and the first surface; and
  - a supply conduit opening defined in the wall at a position above at least a portion of the shelf such that the supply conduit opening and the at least the portion of the shelf are aligned circumferentially relative to the at least one well, the supply conduit opening connecting the at least one liquid supply conduit with the at least one well such that the at least one well is fluidically connected to the at least one intake port;
- a first clear sealing membrane disposed on the first surface of the body, wherein the first clear sealing membrane is configured to cover the opening at the first surface; and
- a second clear sealing membrane disposed on the second surface of the body, wherein the second clear sealing membrane is configured to cover the opening at the second surface.

15. The test card of claim 14, wherein the shelf extends circumferentially about the opening within the at least one well.

16. The test card of claim 14, wherein the supply conduit opening is disposed closer to the first surface than the shelf.

17. The test card of claim 14, wherein the at least one well comprises a plurality of wells.

18. The test card of claim 17, wherein the at least one well comprises 104 wells.

19. The test card of claim 17, wherein the at least one intake port comprises one intake port; wherein each of the plurality of wells comprises a distinct supply conduit opening, including the supply conduit opening associated with a first well; and wherein each distinct supply conduit opening is fluidically connected to the one intake port.

20. The test card of claim 14, further comprising a bubble trap connected to the at least one well via a channel, wherein the channel is connected to the at least one well.

21. The test card of claim 14, wherein the shelf further defines a shelf surface substantially parallel to the first surface or the second surface.

* * * * *